United States Patent Office 3,642,783
Patented Feb. 15, 1972

---

3,642,783
METHENE STILBENYL-1,3,4-OXDIAZOLE DERIVATIVES

Adolf Emil Siegrist, Basel, Peter Liechti, Binningen, Erwin Maeder, Aesch, and Leonardo Guglielmetti, Birsfelden, Switzerland, assignors to Ciba Limited, Basel, Switzerland
No Drawing. Continuation-in-part of application Ser. No. 247,187, May 3, 1966. This application July 11, 1969, Ser. No. 841,106
Claims priority, application Switzerland, May 10, 1965, 6,468/65
Int. Cl. C09b 23/10
U.S. Cl. 260—240 CA    13 Claims

ABSTRACT OF THE DISCLOSURE

New stilbenyl-1,3,4-oxdiazole compounds are provided which may be represented by the formula

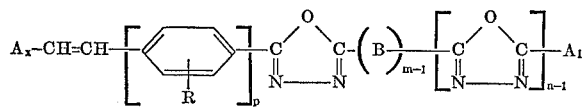

where $A_1$ represents phenyl, naphthyl, diphenylyl, styryl, stilbenyl, thienyl, 2-benzoxazolyl or 2-naphthoxazolyl; B represents a divalent bridge member such as phenylene, furoylene or thienylene; $A_x$ represents phenyl, diphenylyl or naphthyl, R hydrogen, halogen, alkyl, phenyl, carboxyl, sulphonic acid group, hydroxyl or amino and their substitutive or functional derivatives. The terminal phenyl nuclei of the compounds of the above formula may contain 1 or 2 substituents R. The letters $m$, $n$ and $p$ represent 1 or 2.

The compounds of this invention are especially useful for optically brightening organic materials.

CROSS-REFERENCES TO RELATED APPLICATIONS

This is a continuation-in-part of application Ser. No. 547,187, filed May 3, 1966 now abandoned.

The present invention provides new, valuable stilbenyl-1,3,4-oxidiazole derivatives of the general formula (1)

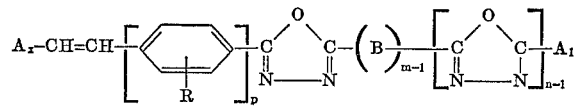

where $A_1$ represents a phenyl, naphthyl, diphenylyl, styryl, stilbenyl, thienyl, 2-benzoxazolyl or 2-naphthoxazolyl radical; B represents a divalent bridge member, namely phenylene, furoylene or thienylene; $A_x$ represents a phenyl, diphenylyl or naphthyl radical, R a hydrogen or halogen atom, an alkyl, phenyl, carboxyl, sulphonic acid group, hydroxyl or amino group, or their substitutive or functional derivatives, and where terminal phenyl nuclei in the general formula may contain 1 or 2 substituents R; and $m$, $n$ and $p$ being 1 or 2.

The above definition covers above all compounds of the formula (2)

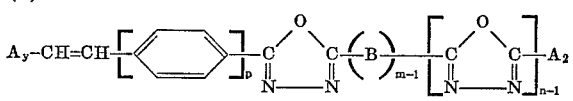

where $A_2$ represents a phenyl, naphthyl, diphenylyl, styryl, stilbenyl, thienyl, 2-benzoxazolyl or 2-naphthoxazolyl group, and where a terminal phenyl nucleus may contain one or two alkyl, carbalkoxy or alkoxy groups or halogen atoms; B represents a divalent bridge member, namely 2,5-furoylene, 2,5-thienylene or 1,4-phenylene; $A_y$ represents a naphthyl radical, a diphenylyl or phenyl radical, which may be substituted by an alkyl or carbalkoxy group or halogen atom, and $m$, $n$ and $p$ are 1 or 2 each.

Another basic type of the general Formula 1 corresponds to the formula (3)

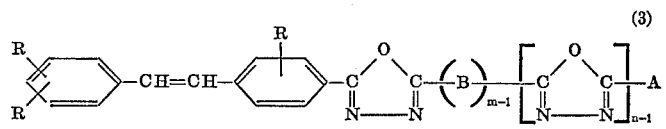

where A represents a phenyl, naphthyl, styryl, stilbenyl, thienyl, 2-benzoxazolyl or 2-naphthoxazolyl group and B stands for a divalent bridge member, namely phenylene, furoylene or thienylene, and $m$ and $n$ each is 1 or 2, and the residues R are substituents such as hydrogen, halogen, alkyl, phenyl, carboxyl, sulpho, hydroxyl or amino groups or their substitutive or functional derivatives. Within the residue A any possibly present phenyl radicals may likewise contain one or two substituents R, and phenylene residues possibly present in the bridge member B may likewise contain a residue R as defined above. The term "substitutive or functional derivatives" used above comprises, apart from the specifically mentioned groups of substituents, those which can be substitutively or functionally derived directly from these substituents, that is to say, for example, apart from alkyl groups also halogenalkyl, hydroxyalkyl, cyanoalkyl, carboxyalkyl, phenylalkyl groups and the like; apart from phenyl groups also alkylphenyl, halogenophenyl, alkoxyphenyl, carboxyphenyl groups and the like; apart from carboxyl groups also carboxylic acid ester, amide, nitrile, hydrazide groups and similar groups; apart from sulpho groups also sulphonic acid ester or amide, alkylsulphone and arylsulphone groups; phenoxy groups, hydroxyalkoxy groups; apart from free amino also alkylated, arylated or acylated amino groups, urethane groups and urea derivatives, triazinyl derivatives and the like, provided they are non-chromophoric.

Compounds of specifically practical value are those which correspond to the formula (3a) 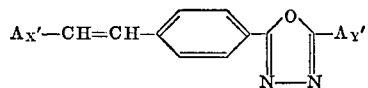

wherein $A_y'$ represents a member selected from the group consisting of phenyl, diphenylyl-(4), β-naphthyl, stilbenyl-(4), β-styryl, thienyl-(2), 5-phenyl-thienyl-(2), furyl-(2), 4 - [benzoxazolyl-(2)]-phenyl, 4-[naphthoxazolyl-(2)] - phenyl, 5 - [benzoxazolyl - (2)] - thienyl-(2), a radical of the formulae

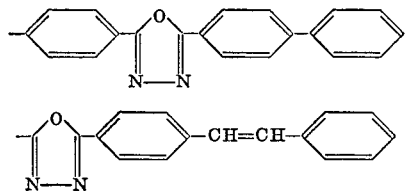

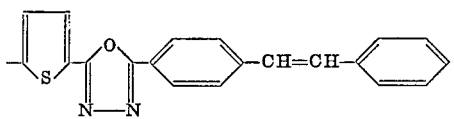

and

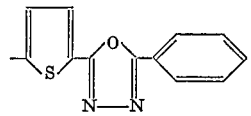

$A_x'$ represents α-naphthyl, β-naphthyl, diphenylyl-(4) or

wherein R is hydrogen, an alkyl group having 1 to 4 carbon atoms, methoxy, halogen, or carbalkoxy with 1 to 4 carbon atoms in the alkyl group, and wherein terminal benzene rings and thienyl residues of the residue $A_y'$ are unsubstituted or substituted with alkyl having 1 to 4 carbon atoms, methoxy, halogen, carbalkoxy with 1 to 4 carbon atoms in the alkyl group or phenyl.

As examples of the new stilbenyl-1,3,4-oxdiazole derivatives of the Formula 1 or 3 there may be specially mentioned those of the following formulae:

(4) 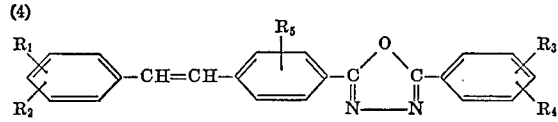

(5) 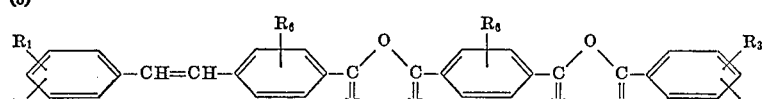

(6) 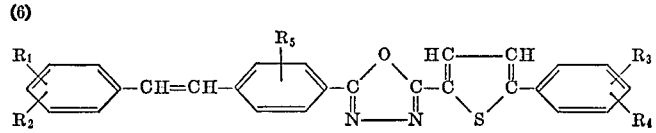

(7) 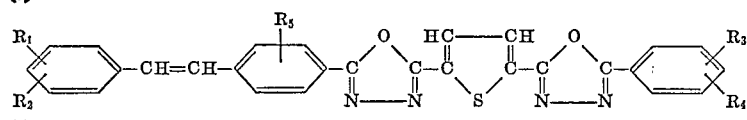

(8) 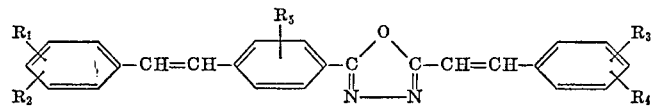

(9) 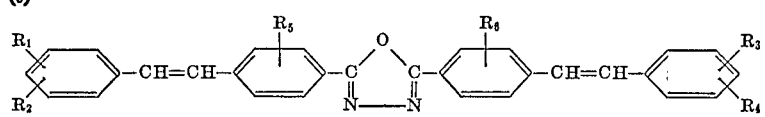

(10) 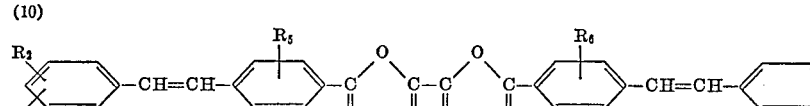

(11) 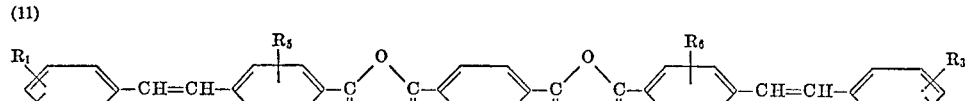

(12) 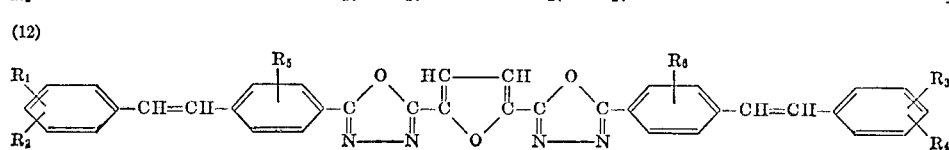

(13) 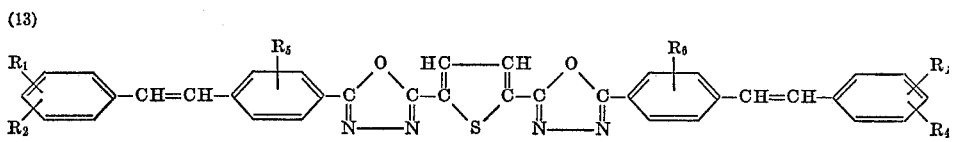

(14) 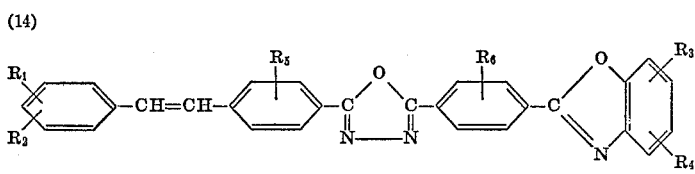

(15) 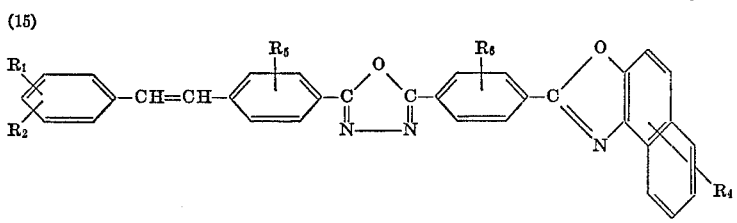

(16) 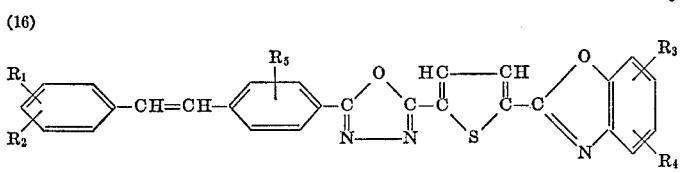

(17) 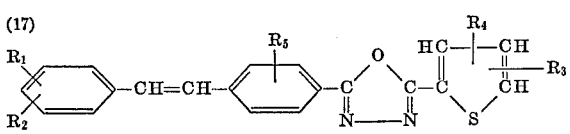

In these formulae $R_1$ and $R_3$ may be identical or different and each represents a hydrogen or halogen atom, a linear or branched alkyl group, a phenyl group, a halogenalkyl, hydroxyalkyl or cyanoalkyl group, a nitrile or hydroxyl group, an alkoxy, aralkoxy or phenoxy group, a carboxyl group, a carboxylic acid ester, amide or hydrazide group; a sulphonic acid group or a sulphonic acid ester or amide group; an alkylsulphone or arylsulphone group, or an amino group which may be substituted by acyl or 1,3,5-triazinyl residues, and $R_2$ and $R_4$ to $R_6$ are identical or different and each represents a hydrogen or chlorine atom, an alkyl group, a free or neutralized sulphonic acid group (—SO$_2$O cation) or a sulphonamide group.

Of special value among the products of this invention are the stilbenyl-1,3,4-oxidazole derivatives of the formulae

(18) 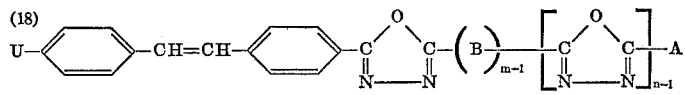

and

(19) 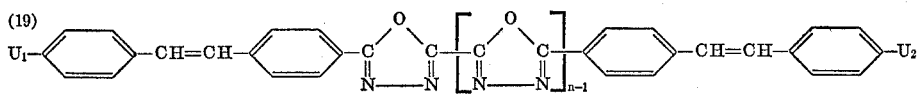

where A, B, $m$ and $n$ have the above meanings, and U, $U_1$ and $U_2$ are identical or different and each represents a hydrogen atom, a carboxylic acid ester group containing up to 18 carbon atoms, for example a carboxylic acid alkyl, alkoxyalkyl, alkenyl, aryl or aralkyl ester group or a carboxylic acid amide group possibly substituted by an alkyl, aralkyl, cycloalkyl or aryl group.

Specifically valuable types of compounds correspond to the following formuae:

Compounds of the formula (19a) 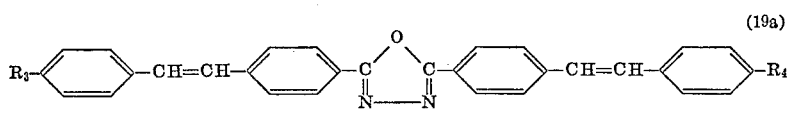

where $R_3$ and $R_4$ each represents a member selected from the group consisting of hydrogen, an alkyl group containing 1 to 4 carbon atoms, carbalkoxy containing up to 2 carbon atoms in the alkyl grouping, chlorine, phenyl and a methoxy group.

Compounds of the formula (19b) 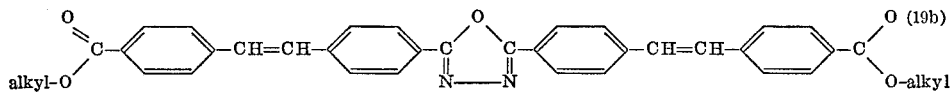

where "alkyl" stands for an alkyl group containing 1 to 2 carbon atoms.

Compounds of the formula

(20)
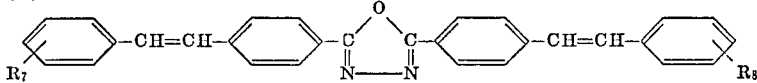

where $R_7$ and $R_8$ are identical or different and each represents a hydrogen atom or an alkyl group containing 1 to 6 carbon atoms, a carboxyl group, a carbalkoxy group containing up to 4 carbon atoms in the alkyl grouping, a chlorine atom, a phenyl group or an alkoxy group containing 1 to 4 carbon atoms.

Compounds of the formula (20a)

where $R_1$ represents hydrogen or carbalkoxy containing up to 4 carbon atoms in the alkyl grouping, and $R_2$ stands for a member selected from the group consisting of hydrogen, an alkyl group containing 1 to 4 carbon atoms, phenyl and 5-[diphenylyl-(4)]-oxdiazol-1,3,4-yl-(2).

Compounds of the formula

(21)
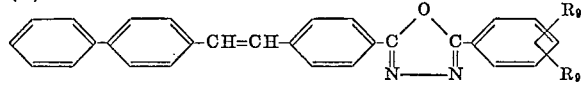

where the residues $R_9$ stand for hydrogen atoms, alkyl groups containing 1 to 6 carbon atoms or alkoxy groups containing 1 to 4 carbon atoms, one residue $R_9$ stands for a phenyl or 2-benzoxazolyl group and the other residue $R_9$ for a hydrogen atom, and two residues $R_9$, together with the phenyl radical to which they are attached, form a naphthyl residue.

Compounds of the formula (21a)
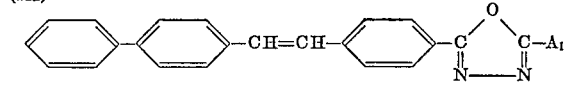

wherein $A_1$ represents a member selected from the group consisting of diphenylyl-(4), β-naphthyl, stilbenyl-(4), thienyl - (2), 5 - phenyl-thienyl-(2), furyl-(2)- 4-[benzoxazolyl - (2)]-phenyl and phenyl which may be substituted by alkyl having 1–4 carbon atoms or carbalkoxy having 1 to 2 carbon atoms in the alkyl-group.

Compounds of the formula

(22)
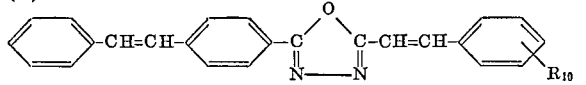

wherein $R_{10}$ represents a hydrogen atoms, a chlorine atom, an alkyl or alkoxy group containing up to 4 carbon atoms each of a phenyl group.

Compounds of the formula (22a)
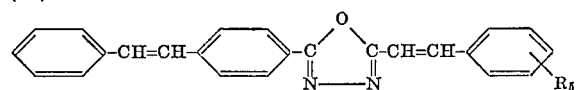

where $R_5$ represents a member selected from the group consisting of hydrogen, alkyl having 1 to 4 carbon atoms, methoxy and phenyl, preferably in p-position.

Compounds of the formula

(23)
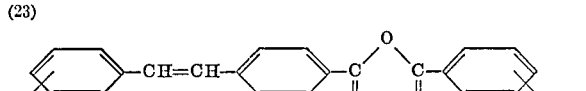

where $R_{11}$ represents a hydrogen atom, a carboxyl group or a carbalkoxy group containing up to 4 carbon atoms in the alkyl grouping, and $R_{12}$ represents hydrogen, an alkyl group containing 1 to 4 carbon atoms, or a phenyl group.

Compounds of the formula

(24)
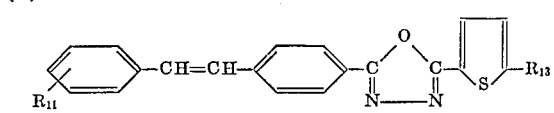

where $R_{11}$ represents a hydrogen atom, a carboxyl or a carbalkoxy group containing 1 to 4 carbon atoms in the alkyl grouping, and $R_{13}$ stands for hydrogen, a carboxyl group, a carbalkoxy group containing 1 to 4 carbon atoms in the alkyl grouping, a 2-benzoxazolyl group or a phenyl group.

Compounds of the formula (24a)
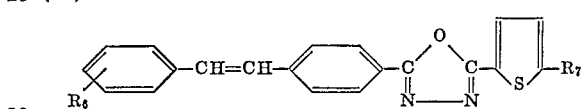

where $R_6$ represents hydrogen, carbalkoxy containing 1 to 2 carbon atoms in the alkyl grouping, and $R_7$ stands for hydrogen, a carbalkoxy group containing 1 to 2 carbon atoms in the alkyl grouping, 2 - (5 - alkylbenzoxazolyl) having 1–4 carbon atoms in the phenyl grouping, phenyl, or 5 - (phenyl)-oxdiazol - 1,3,4 - yl - (2) wherein the 5-phenyl group cay be substituted by methoxy or alkyl with up to 4 carbon atoms.

Compounds of the formula

(25)
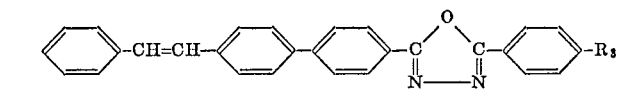

where $R_8$ represents a hydrogen atom, an alkyl group containing 1 to 4 carbon atoms, a phenyl group or a β-styryl group.

Compounds of the formula

(26)
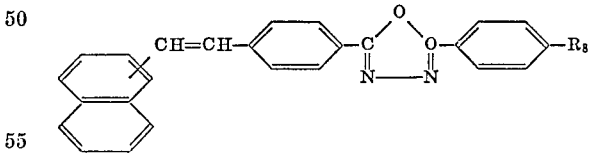

where $R_8$ is a hydrogen atom, an alkyl group containing 1 to 4 carbon atoms, a phenyl group or a β-styryl group.

Compounds of the formula (21b)
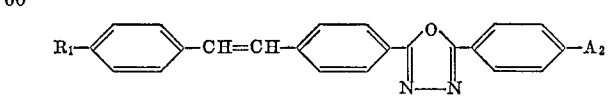

wherein $R_1$ represents hydrogen or carbalkoxy containing up to 4 carbon atoms in the alkyl grouping and $A_2$ stands for naphth(2:1)oxazolyl-(2′) or benzoxazolyl-(2) which may be substituted in position 5 by alkyl with 1–4 carbon atoms.

The new stilbenyl - 1,3,4 - oxdiazole derivatives can be prepared by various known methods.

According to a generally applicable manufacturing method, for example, compounds of the Formula 1 are obtained when an acylhydrazine of the formula

(27)
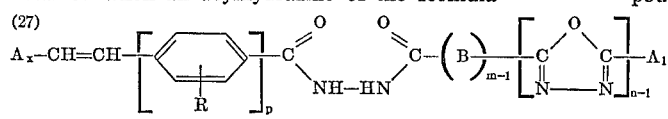

where $A_x$, $A_1$, R, B, $m$, $n$ and $p$ have the above meanings—is cyclized to form the corresponding 1,3,4-oxidaazole derivative by treatment with excess thionylchloride at an elevated temperature.

In an identical manner compounds of the Formula 2 are obtained when an acyl hydrazine of the formula

(28)
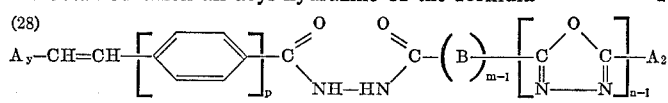

where $A_y$, $A_2$, B, $m$, $n$ and $p$ have the above meanings—is cyclized to form the corresponding 1,3,4-oxdiazole derivative by treatment with excess thionylchloride at an elevated temperature.

When shown for the compounds of the Formula 3 in a more detailed manner, such a manufacturing process consists, for example, in reacting either a stilbene-carboxylic acid halide, preferably a chloride, of the Formula 29 with a hydrazide of the Formula 30 or a stilbene-carboxylic acid hydrazide of the Formula 31 with a carboxylic acid halide (preferably chloride) of the Formula 32 to form the acylhydrazine of the Formula 33 which is then transformed by cyclization into the 1,3,4-oxdiazole. This sequence of reactions can also be shown diagrammatically, with A, B, $m$ and $n$ in the Formulae 30, 32 and 33 having the same meanings as in Formula 3:

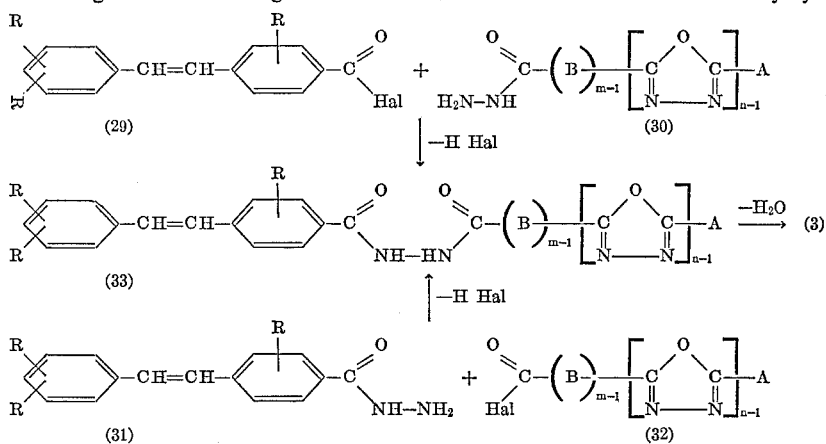

In this manner both symmetrically and asymmetrically constituted compounds of the Formula 3 are accessible.

Symmetrically constituted compounds of the Formula 3, where A represents a stilbenyl residue, are obtained, for example, by reacting a stilbene-carboxylic acid halide of the Formula 29 with hydrazine, hydrazine hydrate, a salt of hydrazine or with a dihydrazide of the Formula 34, where B, $m$ and $n$ have the above meanings, as represented by the following scheme:

In an exactly equal manner the identical type of compound 35 is accessible by reaction of 2 mols of a stilbene-carboxylic acid hydrazide with 1 mol of an acid chloride $B(COHal)_2$. The diacylhydrazine of the Formula 35, where B, $m$ and $n$ have the above meanings, obtained by either of these routes, is then cyclized to form the 1,3,4-oxdiazole.

The reaction of the acid halides of the Formula 29 or 32 with hydrazine, hydrazine hydrate, a salt of hydrazine or a carboxlic acid hydrazide of the Formula 30, 31 or 34 to furnish the acylhydrazine of the Formula 33 or 35 may be carried out in the presence of a tertiary nitrogen base at a temperature ranging from about 50 to 150° C. It is advantageous to use a tertiary nitrogen base of not too low a boiling point, preferably one whose boiling point is at least 100° C., for example N,N-diethylaniline or N,N-dimethylaniline. Particularly good results are obtained with cyclic tertiary nitrogen bases such as quinoline and above all with pyridine bases, such as pyridine itself or an alkylpyridine containing a low-molecular alkyl radical, such as 2-, 3- or 4-methylpyridine (picolines), ethylpyridines or mixtures of such pyridine bases.

Unexpectedly, it has been found that the reaction giving rise to the acylhydrazines of the Formulae 33 and 35 can be carried out very rapidly and smoothly in a highboiling, inert, weakly polar to non-polar organic solvent, for example in ortho-dichlorobenzene or chlorobenzene, in the presence of the stoichiometrically required amount of pyridine bases at about 50 to 150° C., which may be followed by cyclization to the 1,3,4-oxdiazole without intermediate isolation of the acylhydrazine by dropping a little more than the stoichiometrically required amount of thionylchloride in at a temperature from 120 to 220° C.,

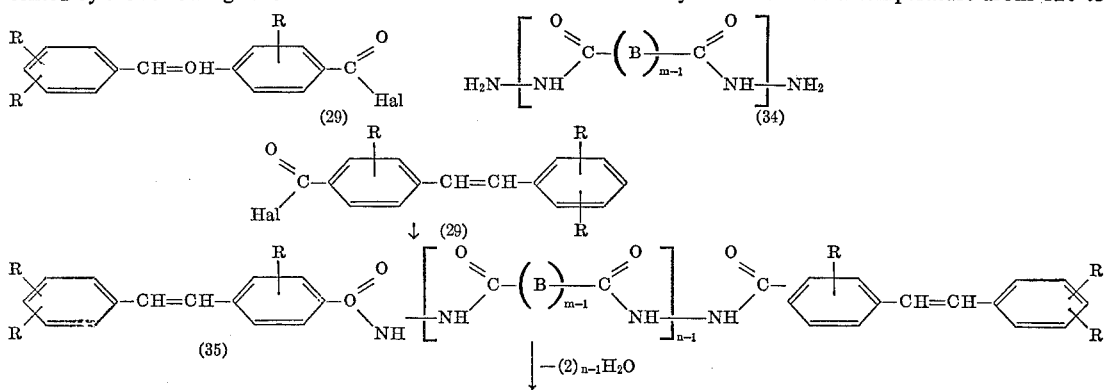

preferably at the boiling temperature of the reaction mixture. This possibility was striking and unexpected because, judging by general experiences in comparable cases, an uncontrollable reaction of the thionylchloride with the stilbene double bond would have been expected to occur.

If desired, the stilbenyl-1,3,4-oxdiazole derivatives of the Formula 1 obtained by the processes described above may be used for further reactions likewise giving rise to compounds of the Formula 1, that is to say that certain substituents may be subsequently introduced into the individual basic substance. Thus, for example, water-soluble derivatives are obtained when (a) The stilbenyl-1,3,4-oxdiazole derivative of the Formula 1 is sulphonated, e.g. with sulphuric acid monohydrate, chlorosulphonic acid or with sulphuric acid containing sulphur trioxide, if desired at an elevated temperature, and the sulphonic acid group is then converted with an organic or preferably an inorganic base into the corresponding salts;

(b) One or several primary or secondary amino groups of the stilbenyl-1,3,4-oxdiazole derivative of the Formula 1 is converted with sultones, e.g. with propanesultone or butanesultone at an elevated temperature into the corresponding alkylsulphonic acid derivative;

(c) One or several primary amino groups of the stilbenyl-1,3,4-oxdiazole derivative of the Formula 1 are converted with aldehyde-bisulphite compounds e.g. with formaldehyde-alkali metal bisulphite, into the corresponding ω-methanesulphonic acid derivative;

(d) One or several primary amino groups of the stilbenyl-1,3,4-oxdiazole derivative of the Formula 1 are reacted with alkylsulphonic or aralkylsulphonic acids, e.g. bromoethanesulphonic acid or benzylchloride-sulphonic acid;

(e) One or several primary or secondary amino groups or hydroxyl groups of the stilbenyl-1,3,4-oxdiazole derivative of the Formula 1 are linked through s-triazin-2-yl bridges with phenolsulphonic acids or anilinesulphonic acids;

(f) In one or several hydroxyl groups of the stilbenyl-1,3,4-oxdiazole derivative of the Formula 1 a polyalkylene ether chain is introduced by means of an alkylene oxide such as ethylene oxide or propylene oxide or with a polyalkylene ether monohalide; the said polyalkylene ether chain must be long enough to ensure solubility in water;

(g) One or several groups capable of quaternation present in the stilbenyl-1,3,4-oxdiazole derivative of the Formula 1 are reacted with quaternating agents, e.g. methyliodide, dimethylsulphate, benzylchloride or toluenesulphonic acid alkyl esters at an elevated temperature, if necessary under superatmospheric pressure;

(h) One or several halogenoalkyl groups of the stilbenyl-1,3,4-oxdiazole derivative of the Formula 1 are converted into the corresponding quaternary derivative with tertiary bases e.g. pyridine.

The new optical brighteners of the composition defined above display in the dissolved or finely dispersed state a more or less pronounced fluorescence. They may be used for optically brightening a wide variety of organic materials of high or low molecular weight or materials containing organic substances.

As relevant examples the following groups of organic materials suitable for optical brightening may be mentioned, without thereby in any way restricting the possible scope:

(I) Synthetic organic materials of high or higher molecular weight:

(a) Polymers based on organic compounds containing at least one polymerizable carbon-to-carbon double bond, i.e. their homopolymers and copolymers and products obtained by after-treating them, such as cross-linked, grafted or decomposition products, polymer dilutions or the like; relevant examples are:

Polymers based on α,β-unsaturated carboxylic acids, especially of acryl compounds (e.g. acrylic esters, acrylic acids, acrylonitrile, acrylamides and their derivatives or their methacrylic analogues), of olefinic hydrocarbons (e.g. ethylene, propylene, isobutylene, styrenes, dienes, especially butadiene, isoprene i.e. also rubbers and rubber-like polymers; further more so-called ABS polymers), polymers based on vinyl and vinylidene compounds (e.g. vinyl esters, vinylchloride, vinylsulphonic acid, vinyl ethers, vinyl alcohol, vinylidenechloride, vinylcarbazole), of halogenated hydrocarbons (chloroprene, highly halogenated ethylenes), of unsaturated aldehydes and ketones (e.g. acrolein or the like), of allyl compounds or the like; graft polymerization products (e.g. by grafting vinylic monomers), cross-linked products (e.g. by means of bifunctional or polyfunctional cross-linking agents such as divinylbenzene, polyfunctional allyl compounds or bisacryl compounds, or products accessible by partial decomposition (hydrolysis, depolymerization) or modification of reactive groupings (e.g. esterification, etherification, halogenation, auto-crosslinking).

(b) Other polymers accessible, for example, by ring opening e.g. polyamides of the polycaprolactam type; furthermore formaldehyde polymers or polymers accessible by polyaddition as well as by polycondensation, such as polyethers, polythioethers, polyacetals and thioplasts;

(c) Polycondensation products or precondensates based on bifunctional or polyfunctional compounds containing condensable groups, their homo- and co-codensates and products obtained by after-treating them; relevant examples are:

Polyesters, saturated (e.g. polyethylene terephthalate) or unsaturated (e.g. maleic acid-dialcohol polycondensates and their cross-linked products with polymerizable vinyl monomers), linear or branched (also those based on polyhydric alcohols e.g. alkyd resins).

Polyamides (e.g. hexamethylenediamine adipate) maleinate resins, melamine resins, phenolic resins (novolaks), aniline resins, furan resins, carbamide resins and their precondensates, and similarly constituted products, polycarbonates, silicone resins and other.

(d) Polyadducts such as polyurethanes (if desired cross-linked), epoxy resins.

(II) Semisynthetic organic materials e.g. cellulose esters or mixed esters (acetate, propionate, nitrocellulose, cellulose ethers, regenerated cellulose [viscose, cuprammonium cellulose]) or products obtained by aftertreating them, casein plastics.

(III) Natural organic materials of animal or vegetable origin, e.g. based on cellulose or proteins such as wool, cotton, silk, bast, jute, hemp, furs and hairs, leathers, finely dispersed wood masses, natural resins (such as colophony, especially lacquer resins); furthermore rubber, gutta percha, balata and products obtained by after-treating or modifying them (e.g. by curing, cross-linking or grafting), decomposition products (e.g. by hydrolysis, depolymerization), products accessible by conversion of reactive groups (e.g. by acylation, halogenation, cross-linking or the like).

The organic materials that can be optically brightened may be at any stage of their processing (raw materials, semi-finished products or finished articles) and physical states. They may be in the form of structures of any desired shape, that is to say, for example, they may be predominantly three-dimensional bodies such as blocks, plates, sections, pipes, injection mouldings or components of any desired kind, chips or granulates, foamed articles; predominantly two-dimensional bodies such as films, foils, lacquers, tapes, coatings, impregnations or coatings; or predominantly unidimensional bodies such as filaments, fibres, flocks, bristles or wires. The said materials may also be as yet not shaped and be in the most varied homogeneous and inhomogeneous forms of dispersion and physical states, for example in the form of powders, solutions, emulsions, dispersions, latices (e.g. lacquer solutions, polymer dispersions), sols, gels, putties, pastes, waxes, adhesives, pore fillers or the like.

Fibrous materials may, for example, take the form of continuous filaments, staple fibres, flocks, hanks, textile threads, yarns, doubled yarns, fibre fleeces, felts, cotton-wool, flocculated products or of textile fabrics or textile laminates, knitwear, of papers, cardboards, paper pulps or the like.

The compounds to be used according to this invention are of special value for the treatment of textile organic materials, especially woven textile fabrics. If fibres—which may be staple fibres or continuous filaments, in the form of hanks, woven or knitted fabrics, fleeces, flocculated substrates or laminates—are to be optically brightened by the present process, this is advantageously done in an aqueous medium in which the chosen compound is finely dispersed (suspended or, if desired, dissolved). If desired, there may be added to the treatment liquor a dispersant, for example soaps, polyglycol ethers of fatty alcohols, fatty amines or alkylphenols, cellulose sulphite waste liquor or condensation products of (possibly alkylated) naphthalenesulphonic acids with formaldehyde. It has been found particularly advantageous to work in a neutral, weakly alkaline or acid bath. Likewise, it is advantageous to perform the treatment at a temperature from about 50 to 100° C., for example at the boiling temperature of the bath or in its vicinity (at about 90° C.). The improving treatment according to this invention may also be carried out with solutions in organic solvents.

Furthermore, the new optical brighteners to be used in this invention may be added to, or incorporated with, the materials before or during their shaping. Thus, for example, in the manufacture of films, foils, tapes or mouldings they may be added to the moulding or injection moulding compositions or they may be dissolved, dispersed or in any other way finely distributed in the spinning mass before spinning. The optical brighteners may also be added to the starting materials, reaction mixtures or intermediate products used to produce fully synthetic or semi-synthetic organic materials, that is to say before or during the chemical reaction, e.g. a polycondensation (including the precondensates), a polymerization (including the precondensates), a polymerization (including the prepolymer) or a polyaddition.

The new optical brighteners can, of course, also be used whenever organic materials of the kind indicated above are combined with inorganic materials in any desired form (typical examples: detergents, white pigments in organic substances).

The new optical brighteners are distinguished by their particularly good heat resistance and fastness to light and to migration.

The amount of the new optical brightener to be used according to this invention, referred to the weight of the material to be optically brightened, may vary within wide limits. Even very small amounts, in some cases for instance as little as 0.001% by weight, may suffice to produce a distinct and durable effect, though it is also possible to use amounts of up to about 0.5% by weight or more. For most practical purposes an amount ranging from 0.01 to 0.2% by weight will be preferred.

The new compounds, to be used as brightening agents, may also be applied, for example, as follows:

(a) In admixture with dyestuffs or pigments or as additives to dyebaths, or printing, discharge or reserve pastes. Also for after-treating dyeings, prints or discharge prints.

(b) In admixture with so-called "carriers," antioxidants, light filters, heat stabilizers, chemical bleaches or as additives to bleaching baths.

(c) In admixture with cross-linking agents, dressings such as starch or synthetic dressings. It may also be of advantage to add the products of this invention to the liquors used for producing an anti-crease finish.

(d) In combination with detergents. The detergent and the optical brightener may be added separately to the washing liquor. It is also advantageous to use detergents that as such already contain a share of brigtening agent. Suitable detergents are e.g. soaps, salts of sulphonate washing agents e.g. of sulphonated benzimidazoles substituted on the carbon atom 2 by higher alkyl radicals, also salts of monocarboxylic acid esters of 4-sulphophthalic acid with higher fatty alcohols, also salts of fatty alcohol sulphonates, alkylarylsulphonic acids or condensation products of higher fatty acids with aliphatic hydroxysulphonic or aminosulphonic acids. Furthermore, there may be used non-ionic detergents e.g. polyglycol ethers derived from ethylene oxide and higher fatty alcohols, alkylphenols or fatty amines.

(e) In combination with polymeric vehicles (polymers, polycondensates or polyadducts) in which the brightening agent, if desired in addition to other substances, is incorporated in the dissolved or dispersed form, for example in the case of coating, impregnating or binding agents (solutions, dispersions, emulsions) for textile materials, fleeces, papers or leathers.

(f) As additives to a wide variety of industrial products to improve their presentation or to obviate disadvantage in their use, for example as additives to glues, adhesives, paints or the like.

The treatment of polyester fibres or polyamide fibres with the optical brighteners of this invention may also consist, for example, in impregnating these fibres with an aqueous dispersion of the brightener at a temperature below 75° C., for example at room temperature, and then subjecting them to a dry heat treatment at a temperature above 100° C.; in this connection it has proved advantageous first to dry the impregnated fibrous material at a moderately raised temperature, for example from at least 60 to about 100° C. The heat treatment of the dry material is advantageously carried out at a temperature from 120 to 225° C., for example by heating in a drying chamber, by ironing within the indicated temperature range or by treatment with dry superheated steam. The drying and the dry heat treatment may alternatively be carried out one following immediately upon the other or they may be combined in a single stage.

Of special value is the use of compounds of the Formulae 20 and 21 for brightening synthetic polyamides (of the polyhexamethylenediamine adipate type or polycaprolactam type) from the spinning mass, whereas optical brighteners represented by the Formula 20 or 22 are of value to the brightening of polyamide fibres by subsequently treating the fibre by the exhaustion or impregnation method.

The compounds of the above formulae can be used as scintillators for various photographic purposes, such as electrophotographic reproduction or for supersensitizing.

If the brightening operation is to be combined with other treating or improving operations, the combined treatment is advantageously performed with the use of a suitable stable preparation which contains in addition to optically brightening compounds of the above general formula also dispersants, detergents, carriers, dyestuffs, pigments or dressing agents.

EXAMPLE 1

A mixture of 31.6 g. of 4'-carbethoxy-stilbene-4-carboxylic acid chloride of the formula

(36) 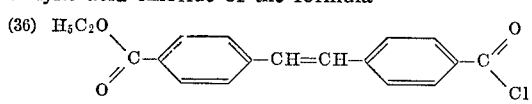

19.3 g. of para-tertiary butyl benzoic acid hydrazide and 16 g. of pyridine in ½ litre of dry ortho-dichlorobenzene is heated within 40 minutes with stirring to 100° to 110° C., then further stirred for 1½ hours at this temperature and then within 30 minutes heated to 165° C. In the course of 15 minutes at 165° C. 24 g. of thionylchloride are dropped into the vigorously stirred, almost colourless suspension. The reaction product, which by now has turned yellow, is stirred for another 5 minutes at this temperature and then cooled to about 15° C.; ½ litre of methanol is added and the precipitated 2-[4″-carbethoxy-stilbenyl-(4′)]-5-[4‴-tertiary-butyl-phenyl-(1‴)]-1,3,4-oxdiazole of the formula

(37)
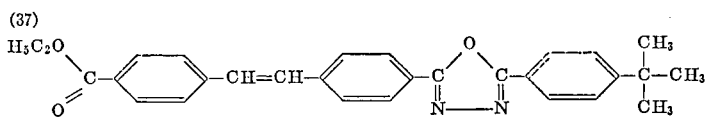

is suctioned off, washed with methanol and dried, to yield about 25.1 g. (=55.5% of theory) of a pale-yellow, finely crystalline powder which melts at 198° to 199.5° C. Three recrystallizations from tetrachloroethylene with the aid of bleaching earth furnish pale-yellow, very fine needles melting at 200.5° to 201.5° C.

*Analysis.*—$C_{29}H_{28}O_3N_2$ (molecular weight: 452.53): Calculated (percent): C, 76.97; H, 6.24; N, 6.19. Found (percent): C, 76.67; H, 6.20; N, 6.10.

The 4′-carbethoxy-stilbene-4-carboxylic acid chloride of the Formula 36 used as starting material may be prepared thus:

A solution of 324 g. of stilbene-4,4′-dicarboxylic acid diethyl ester in 1 litre of ethanol and 4 litres of dioxane is mixed at 40° C. with 100 ml. of 10 N-sodium hydroxide solution. After stirring for 1 hour at 40° C., the resulting thick, cream coloured paste is cooled to about 20° C., suctioned, washed with dioxane and thoroughly expressed. The moist filter cake is stirred for 2 hours in 10 litres of hydrochloric acid solution of 5% strength, suctioned and washed neutral with water. The crude filter cake is then stirred for 60 minutes in 2 litres of N-aqueous triethanolamine solution and the undissolved matter is filtered off. The filtrate is acidified with concentrated hydrochloric acid, and the resulting precipitate suctioned, washed neutral and dried, to yield about 231 g. of 4′-carbethoxy-stilbene-4-carboxylic acid of the formula

(38)
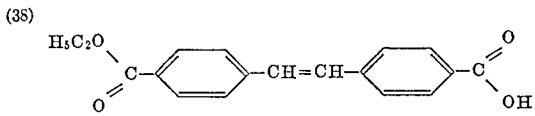

as a colourless powder whose melting point (230° to 300° C.) depends considerably on the speed of heating.

*Analysis.*—$C_{18}H_{16}O_4$ (molecular weight: 296.31): Calculated (percent): C, 72.96; H, 5.44; O, 21.60. Found (percent). C, 72.75; H, 5.40; O, 21.34.

When the acid described is boiled for 3 hours with an excess of thionylchloride, the 4′-carbethoxy-stilbene-4-carboxylic acid chloride of the Formula 36 is obtained in a yield of 97% of the theoretical. It forms colourless crystals from trichloroethylene, melting at 134° to 136° C.

*Analysis.*—$C_{18}H_{15}O_3Cl$ (molecular weight: 314.77): Calculated (percent): C, 68.68; H, 4.80; Cl, 11.26. Found (percent): C, 68.28; H, 4.83; Cl, 11.54.

In an analogous manner 4′-isopropoxy-stilbene-4-carboxylic acid chloride and 4′-n-butoxy-stilbene-4-carboxylic acid chloride may be obtained from stilbene-4,4′-dicarboxylic acid di-isopropyl ester (M.P. 134–136° C.) and stilbene-4,4′-dicarboxylic acid di-n-butyl ester (M.P. 90–92° C.), respectively.

When in this example 21.2 g. of diphenyl-4-carboxylic acid hydrazide are used instead of 19.3 g. of para-tertiary butyl-benzoic acid hydrazide, there are obtained about 37.8 g. (=80.2% of theory) of 2-[4″-carbethoxy-stilbenyl-(4′)]-5-[4‴-biphenylyl-(1‴)]-1,3,4-oxadiazole of the formula

(39)
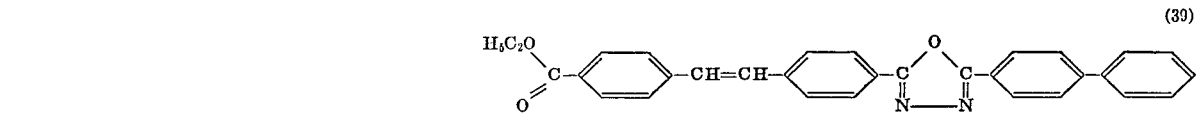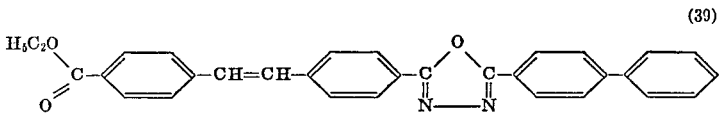

in faintly greenish, very fine crystals from ortho-dichlorobenzene, melting at 269.5 to 270.5° C.

*Analysis.*—$C_{31}H_{24}O_3N_2$ (molecular weight: 472.52): Calculated (percent): C, 78.79; H, 5.12; N, 5.93. Found (percent): C, 78.72; H, 5.14; N, 6.16.

If 4′-isopropoxy-stilbene-4-carboxylic acid chloride or 4′-n-butoxy-stilbene-4-carboxylic acid chloride is used instead of 4′-carbethoxy-stilbene-4-carboxylic acid chloride, there is obtained 2-[4″-isopropoxy-stilbenyl-(4′)]-5-[4‴-biphenylyl-(1‴)]-1,3,4-oxdiazole or 2-[4″-n-butoxy-stilbenyl-(4′)]-5-[4‴-biphenylyl-(1‴)]-1,3,4-oxdiazole, respectively.

The following stilbenyl-1,3,4-oxdiazole derivatives may be prepared in a similar manner:

2-[4″-carbethoxy-stilbenyl-(4′)]-5-phenyl-1,3,4-oxdiazole of the formula

(40)
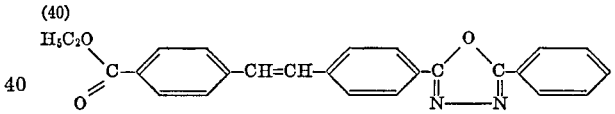

in a yield of 59.1% of theory. Light-yellow, finely crystalline powder from dioxane+ethanol, melting at 180.5° to 181.5° C.

*Analysis.*—$C_{25}H_{20}O_3N_2$ (molecular weight: 396.43): Calculated (percent): C, 75.74; H, 5.09; N, 7.07. Found (percent): C, 75.44; H, 5.26; N, 7.14.

2-[stilbenyl-(4′)]-5-[naphthyl-(2″)]-1,3,4-oxidazole of the formula

(41)
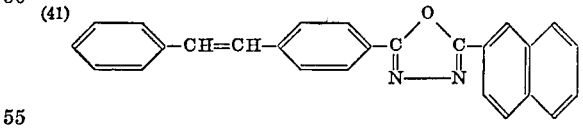

in a yield of 74.5% of theory. Pale-yellow, shiny flakes from ortho-dichlorobenzene, melting at 199° to 199.5° C.

*Analysis.*—$C_{26}H_{18}ON_2$ (molecular weight: 374.42): Calculated (percent): C, 83.40; H, 4.85; N, 7.48. Found (percent): C, 83.21; H, 4.90; N, 7.35.

2-[stilbenyl-(4′)]-5-[4″-methyl-phenyl-(1″)]-1,3,4-oxdiazole of the formula

(42)
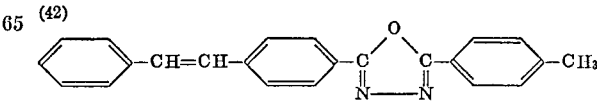

in a yield of 83.7% of theory. Almost colourless, very fine needles from tetrachloroethylene, melting at 193.5 to 194.5° C.

*Analysis.*—$C_{23}H_{18}ON_2$ (molecular weight: 338.39): Calculated (percent): C, 81.63; H, 5.36; N, 8.28. Found (percent): C, 81.53; H, 5.10; N, 8.55.

2-[stilbenyl-(4')] - 5 - [4''-biphenylyl-(1'')]-1,3,4-oxdiazole of the formula

(43)
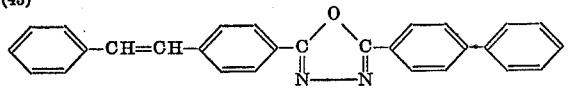

in a yield of 87.5% of theory. Colourless needles and flakes from tetrachloroethylene, melting at 227° to 228° C.

Analysis.—$C_{28}H_{20}ON_2$ (molecular weight: 400.46): Calculated (percent): C, 83.97; H, 5.03; N, 7.00. Found (percent): C, 84.15; H, 5.11; N, 6.90.

EXAMPLE 2

A mixture of 8.91 g. of 4-[2'-(4''-biphenylyl-(1'')]-1',3',4'-oxdiazolyl-(5')]-benzoic acid hydrazide of the formula

(44)
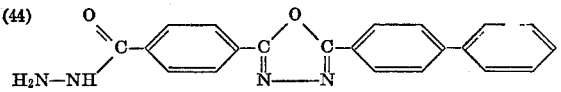

7.9 g. of 4'-carbethoxy-stilbene-4-carboxylic acid chloride of the Formula 36 and 8 g. of pyridine in 200 ml. of anhydrous ortho-dichlorobenzene is heated with stirring within 30 minutes to 100° to 110° C., then stirred on for 1 hour at this temperature and then heated within 15 to 30 minutes to 160° to 165° C. At 160° to 165° C. within 15 minutes 12 g. of thionylchloride are dropped into the vigorously stirred colourless suspension. The yellow reaction product is stirred on for 5 minutes at this temperature, cooled to about 20° C., suctioned off, washed with methanol and dried, to yield about 12.9 g. (=83.9% of theory) of the 1,3,4-oxdiazole of the formula

(45)
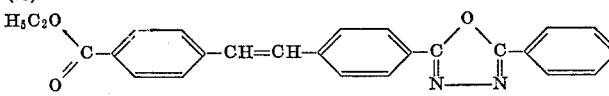

in the form of a faintly yellowish powder which melts at 326° to 327° C. and after two recrystallizations from trichlorobenzene with the aid of bleaching earth forms faintly yellowish, very fine crystals melting at 337.5° to 339° C.

Analysis.—$C_{39}H_{28}O_4N_4$ (molecular weight: 616.65): Calculated (percent): C, 75.96; H, 4.58; N, 9.09. Found (percent): C, 75.87; H, 4.59; N, 9.22.

The 4-[2'-(4''-biphenylyl-(1'')] - 1',3',4' - oxdiazolyl-(5')]-benzoic acid hydrazide of the Formula 44 used as starting material may be prepared as follows:

A mixture of 106.1 g. of diphenyl-4-carboxylic acid hydrazide and 93.5 g. of terephthalic acid monomethyl ester chloride and 80 g. of pyridine is heated in 800 ml. of anhydrous ortho-dichlorobenzene within 40 minutes to 100° to 110° C., stirred on for 1 hour at this temperature and then heated within 30 minutes to 160° to 165° C. In the course of 40 minutes at 160° to 165° C. 70 g. of thionylchloride are dropped into the colourless suspension, during which gradually a solution forms. The batch is stirred for another 5 to 10 minutes at this temperature, cooled to about 15° C., and the crystalline reaction product is suctioned off, washed with methanol and dried, to yield about 157.2 g. (=88.3% of theory) of 2-[4'-biphenylyl-(1')]-5-[4'' - carbomethoxyphenyl-(1'')]-1,3,4-oxdiazole of the formula

(46)
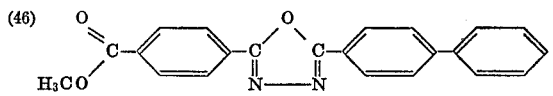

in the form of an almost colourless, finely crystalline powder which melts at 217° to 218° C. and after three recrystallizations from ortho-dichlorobenzene with the aid of bleaching earth forms colourless, very fine crystals melting at 220° to 220.5° C.

Analysis.—$C_{22}H_{16}O_3N_2$ (molecular weight: 356.36): Calculated (percent): C, 74.14; H, 4.53; N, 7.86. Found (percent): C, 74.14; H, 4.55; N, 8.18.

The hydrazide of the Formula 44 is prepared by stirring 106.9 g. of methyl ester of the Formula 46 in 1.5 litres of methylglycol with 75 g. of hydrazine hydrate for 15 hours under reflux, then cooling the batch to room temperature, and suctioning the reaction product off, washing it with methanol and drying, to yield about 93.7 g. (=87.7% of theory) of 4-[2'-(4''-biphenylyl-(1'')]-1',3',4'-oxdiazolyl-(5')]-benzoic acid hydrazide of the Formula 46 in the form of a colourless powder melting at 337° to 338° C.

EXAMPLE 3

A mixture of 12.2 g. of stilbene-4-carboxylic acid chloride, 13.4 g. of 4-[5-methyl-benzoxazolyl-(2')]-benzoic acid hydrazide of the formula

(47)
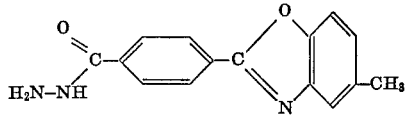

and 10 ml. of pyridine in 400 ml. of anhydrous ortho-dichlorobenzene is heated within 30 minutes to 100° to 110° C. while being stirred, then further stirred for 1 hour at this temperature and then heated within 15 to 30 minutes to 165° to 170° C. Within 15 minutes at 165° to 170° C. 12 g. of thionylchloride are dropped into the vigorously stirred, colourless suspension, whereupon gradually a solution forms. The batch is stirred on for 5 minutes at this temperature, cooled to about 15° C. and the precipitated 1,3,4-oxdiazole derivative of the formula

(48)
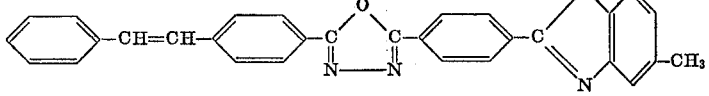

is suctioned off, washed with methanol and dried, to yield about 18.6 g. (=82% of theory) of a faintly yellowish, finely crystalline powder which melts at 333 to 338° C.; after having been recrystallized three times from ortho-dichlorobenzene with the aid of bleaching earth, it forms almost colourless, very fine needles melting at 341° to 343° C.

Analysis.—$C_{30}H_{21}O_2H_3$ (molecular weight: 455.49): Calculated (percent): C, 79.10; H, 4.65; N, 9.23. Found (percent): C, 78.82; H, 4.79; N, 9.36.

The following 1,3,4-oxdiazole derivatives may be prepared in a similar manner:

From 15.8 g. of 4'-carbethoxy-stilbene-4-carboxylic acid chloride of the Formula 36 and 13.4 g. of 4-[5- methyl-benzoxazolyl-(2')]-benzoic acid hydrazide of the Formula 47: The 1,3,4-oxdiazole derivative of the formula (49)

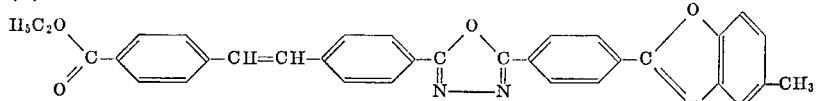

in a yield of 22.3 g. (=85% of theory). Pale greenish yellow, finely crystalline powder from ortho-dichlorobenzene, melting at 318° to 320° C.

Analysis.—$C_{33}H_{25}O_4N_3$ (molecular weight: 527.55): Calculated (percent): C, 75.13; H, 4.78; N, 7.97. Found (percent): C, 75.08; H, 4.77; N, 8.26.

From 7.9 g. of 4'-carbethoxy-stilbene-4-carboxylic acid chloride of the Formula 36 and 7.58 g. of 4-[naphth(2:1)-oxazolyl-(2')]-benzoic acid hydrazide of the formula (50)

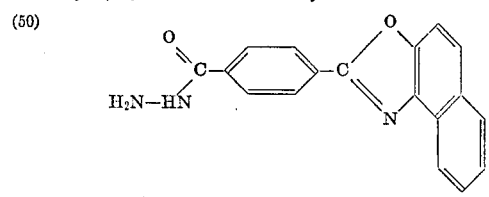

the 1,3,4-oxdiazole derivative of the formula (51)

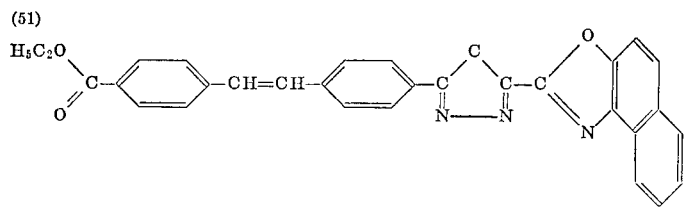

in a yield of 9.5 g. (=67.9% of theory). Light-yellow, very fine crystals from ortho-dichlorobenzene, melting at 328.5° to 329° C.

Analysis.—$C_{36}H_{25}O_4N_3$ (molecular weight: 563.58): Calculated (percent): C, 76.72; H, 4.47; N, 7.46. Found (percent): C, 76.80; H, 4.59; N, 7.48.

From 6.14 g. of stilbene-4-carboxylic acid chloride and 7.58 g. of 4 - [naphth(2:1)-oxazolyl-(2')]-benzoic acid hydrazide of the Formula 50 the 1,3,4-oxdiazole derivative of the formula (52)

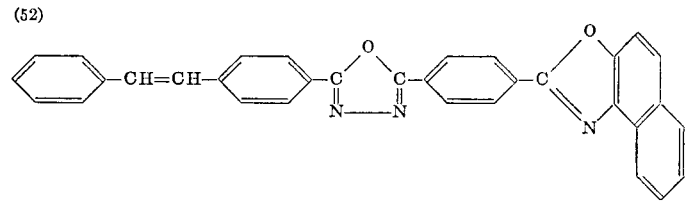

in a yield of 8.1 g. (=65.8% of theory). Light-yellow, very fine crystals from ortho-dichlorobenzene, melting at 330° to 331° C.

Analysis.—$C_{33}H_{21}O_2N_3$ (molecular weight: 491.55): Calculated (percent): C, 80.64; H, 4.31; N, 8.55. Found (percent): C, 80.30; H, 4.21; N, 8.49.

The 4-[naphth(2:1)-oxazolyl-(2')] - benzoic acid hydrazide of the Formula 50 used as starting material may be prepared thus:

63.6 grams of 1-amino-2-hydroxynaphthalene and 79.5 g. of benzene-1-carboxylic acid methyl ester-4-carboxylic acid chloride are heated with exclusion of air in 400 ml. of anhydrous ortho-dichlorobenzene gradually within 3½ hours to 160° C. 2 grams of boric acid are then added and the temperature is raised to about 200° to 210° C., during which the ortho-dichlorobenzene is distilled off almost completely; during the following cooling the brown reaction solution is diluted with 200 ml. of dioxane and then with 200 ml. of methanol, cooled to 1° C., suctioned,

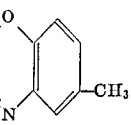

washed with cold methanol and dried, to yield about 115.8 g. (=95.4% of theory) or 4-[naphth(2:1)-oxazolyl-(2')]-benzoic acid methyl ester in the form of a light, yellowish powder which melts at 198° to 199° C. For purification the ester is recrystallized from tetrachloroethylene with the aid of bleaching earth and sublimed in a high vacuum, to yield an almost colourless, finely crystalline powder melting at 203° C.

Analysis.—$C_{19}H_{13}O_3N$ (molecular weight: 303.30): Calculated (percent): C, 75.24; H, 4.32; N, 4.62. Found (percent): C, 75.47; H, 4.26; N, 4.63.

151.5 grams of the methyl ester are stirred for 24 hours at 110° to 115° C. in 750 ml. of diethyleneglycol diethyl ether with 50 g. of hydrazine hydrate, then cooled, diluted with 1 litre of methanol, and the product is suctioned, washed with methanol and dried, to yield about 151.2 g. (=99.8% of theory) of 4-[naphth(2:1)-oxazolyl-(2')]-benzoic acid hydrazide of the Formula 50 in the form of a pale-yellow, finely crystalline powder melting above 400° C.

The 4-[5-methyl-benzoxazolyl-(2')]-benzoic acid hydrazide of the Formula 47 used as starting material may be prepared in a similar manner. It forms almost colourless, fine needles melting at 259.5° to 260.5° C.

EXAMPLE 4

15.8 grams of 4'-carbethoxy-stilbene-4-carboxylic acid chloride of the Formula 36, 1.25 g. of hydrazine hydrate and 8 g. of pyridine in 200 ml. of anhydrous ortho-dichlorobenzene are heated within 30 minutes to 100 to 110° C. while being stirred, then stirred on for 1 hour at this temperature and then heated within 15 to 30 minutes to 170° C. In the course of 15 minutes at 170° C. 12 g. of thionylchloride are dropped into the vigorously stirred, almost colourless suspension. The reaction product, which has by now dissolved almost completely, is stirred for another 5 minutes at 170° C. and then cooled to about 15° C. The precipitated crystalline 2,5-bis[4''-carbethoxy-stilbenyl-(4')]-1,3,4-oxdiazole of the formula (53)

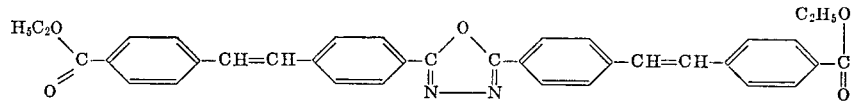

is suctioned off, washed with methanol and dried, to yield about 10.2 g. (=71.6% of theory) of faintly yellowish crystals melting at 330° to 332° C. After three recrystallizations from ortho-dichlorobenzene with the aid of bleaching earth the product forms faintly yellowish, shiny, fine crystals melting at 330° to 331° C.

*Analysis.*—$C_{36}H_{30}O_5N_2$ (molecular weight: 570.62): Calculated (percent): C, 75.77; H, 5.30; N, 4.91. Found (percent): C, 75.76; H, 5.48; N, 5.03.

2,5-bis-[4″-phenyl-stilbenyl-(4′)]-1,3,4-oxdiazole of the formula

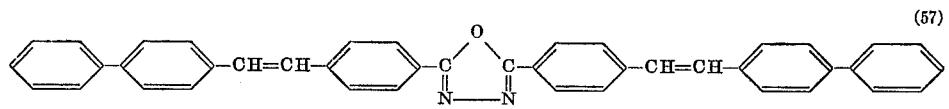
(57)

If 4′-isopropoxy-stilbene-4-carboxylic acid chloride or 4′-n-butoxy-stilbene-4-carboxylic acid chloride is used instead of 4′-carbethoxy-stilbene-4-carboxylic acid chloride, there is obtained 2,5-bis-[4″-isopropoxy-stilbenyl-(4′)]-1,3,4 - oxdiazole or 2,5-bis-[4″-n-butoxy-stilbenyl-(4′)]-1,3,4-oxdiazole, respectively.

In a similar manner 4′-methyl-stilbene-4′-carboxylic acid chloride furnishes 2,5-bis-[4″-methyl-stilbenyl-(4′)]-1,3,4-oxdiazole of the formula in a yield of 89.4% of the theoretical. Light-yellow, shiny flakes from trichlorobenzene, melting at 382° to 384° C.

*Analysis.*—$C_{42}H_{30}ON_2$ (molecular weight: 578.68): Calculated (percent): C, 87.17; H, 5.23; N, 4.84. Found (percent): 87.28; H, 5.25; N, 4.91.

EXAMPLE 5

A mixture of 11.9 g. of stilbene-4-carboxylic acid hydrazide, 12.2 g. of stilbene-4-carboxylic acid chloride and

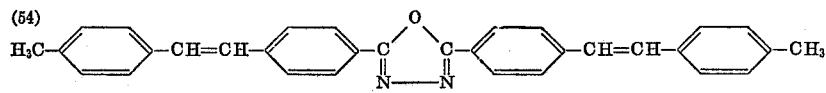
(54)

in a yield corresponding to about 49.3% of the theoretical, in the form of faintly yellowish, shiny flakes from ortho-dichlorobenzene, melting at 306° to 307° C.

*Analysis.*—$C_{32}H_{26}ON_2$ (molecular weight: 454.54): Calculated (percent): C, 84.55; H, 5.77; N, 6.16. Found (percent): C, 84.28; H, 5.69; N, 6.15.

The following stilbenyl-1,3,4-oxdiazole derivatives may be prepared in a similar manner:

2,5-bis-[4″-methoxy-stilbenyl-(4′-)]-1,3,4-oxdiazole of the formula 10 g. of pyridine in 200 ml. of dry ortho-dichlorobenzene is heated within 30 minutes to 100° to 110° C. while being stirred, then stirred on for 1 hour at this temperature and then in the course of 15 to 30 minutes heated to 165° to 170° C. Within 15 minutes at 165° to 170° C. 12 g. of thionylchloride are dropped into the pale yellow suspension, whereupon a clear, yellow solution forms which is stirred on for 5 minutes at this temperature and then cooled to about 15° C., whereupon the reaction product crystallizes out. After suctioning, washing with methanol

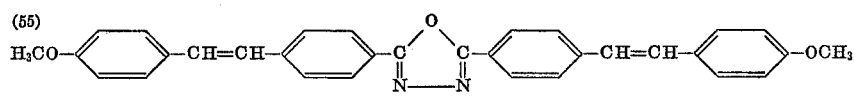
(55)

in the form of faintly yellowish, shiny, felted needles and flakes from ortho-dichlorobenzene, melting at 310° to 310.5° C.

and drying, there are obtained about 17.4 g. (=81.8% of theory) of 2,5-bis-[stilbenyl-(4′)]-1,3,4-oxdiazole of the formula

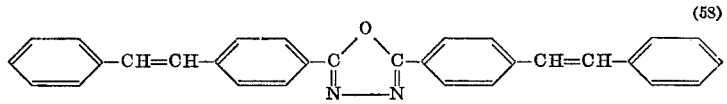
(58)

*Analysis.*—$C_{32}H_{26}O_3N_2$ (molecular weight: 486.54): Calculated (percent): C, 78.99; H, 5.39; N, 5.76. Found (percent): C, 78.91; H, 5.46; N, 5.85.

2,5-bis-[4″-chloro-stilbenyl-(4′)]-1,3,4-oxdiazole of the formula in the form of pale yellowish, small needles melting at 278° to 279° C., which, after three recrystallizations from orthodichlorobenzene with the aid of bleaching earth, forms almost colorless, shiny, fine flakes melting at 279° to 279.5° C.

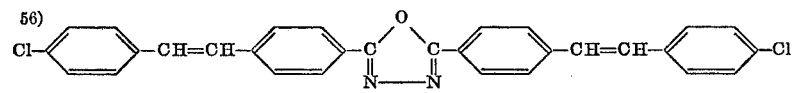
56)

in the form of faintly greenish, shiny flakes and needles from ortho-dichlorobenzene, melting at 305° to 305.5° C.

*Analysis.*—$C_{30}H_{20}ON_2Cl_2$ (molecular weight: 495.41): Calculated (percent): C, 72.74; H, 4.07; N, 5.65. Found (percent): C, 72.75; H, 4.19; N, 5.74.

*Analysis.*—$C_{30}H_{22}ON_2$ (molecular weight: 426.49): Calculated (percent): C, 84.48; H, 5.20; N, 6.57. Found (percent): C, 84.12; H, 5.17; N, 6.81.

When the 12.2 g. of stilbene-4-carboxylic acid chloride are replaced by 15.8 g. of 4′-carbethoxy-stilbene-4-carboxylic acid chloride of the Formula 36, there are obtained about 18.9 g. (=76% of theory) of 2-[4'''-carbethoxy-stilbenyl - (4')]-5-[stilbenyl-(4''')]-1,3,4-oxdiazole of the formula

(59)
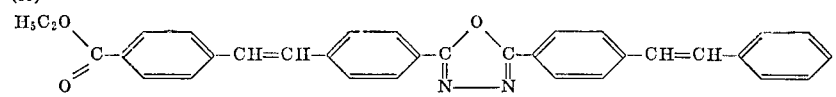

which, after two recrystallizations from ortho-dichlorobenzene with the aid of bleaching earth, forms faintly yellowish, very fine crystals melting at 308 to 309° C.

*Analysis.*—$C_{33}H_{26}O_3N_2$ (molecular weight: 498.55): Calculated (percent): C, 79.50; H, 5.26; N, 5.62. Found (percent) C, 79.39; H, 5.24; N, 5.79.

If 4'-isopropoxy-stilbene-4-carboxylic acid chloride or 4'-n-butoxy-stilbene-4-carboxylic acid chloride is used instead of 4-carboxylic acid chloride there is obtained 2-[4'' - isopropoxy-stilbenyl - (4')]-5-[stilbenyl - (4''')]-1,3,4 - oxdiazole or 2 - [4''-n-butoxy-stilbenyl-(4')]-5-[stilbenyl-(4''')]-1,3,4-oxdiazole, respectively.

EXAMPLE 6

A mixture of 24.2 g. of stilbene-4-carboxylic acid chloride, 5.9 g. of oxalic acid dihydrazide and 16 g. of pyridine in 250 ml. of anhydrous ortho-dichlorobenzene is heated within 30 minutes to 100° to 110° C. while being stirred, further stirred for 1 hour at this temperature and then heated within 15 to 30 minutes to 165° to 170° C. Within 20 minutes at 165° to 170° C. 18 g. of thionylchloride are dropped into the colourless suspension. The batch is stirred for another 5 minutes at this temperature, then the yellow suspension is cooled to about 15° C., and the reaction product is suctioned off, washed with methanol and dried, to yield about 18.5 g. (=74.9% of theory) of 2-[stilbenyl-(4')]-5-[5''-stilbenyl-(4''') - 1'',3'',4'' - oxidiazolyl-(2'')]-1,3,4-oxdiazole of the formula

(60)
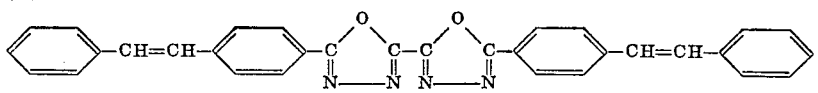

in the form of a faintly yellowish, finely crystalline powder which melts at 320 to 323° C. and after three recrystallizations from ortho-dichlorobenzene with the aid of bleaching earth forms very fine, faintly yellowish crystals melting at 331° to 332° C.

*Analysis.*—$C_{32}H_{22}O_2N_4$ (molecular weight: 494.53): Calculated (percent): C, 77.71; H, 4.48; N, 11.33. Found (percent): C, 77.66; H, 4.63; N, 11.18.

The following 1,3,4-oxdiazole derivatives are obtained in a similar manner:

From 31.6 g. of 4'-carbethoxy-stilbene-4-carboxylic acid chloride of the Formula 36 and 5.9 g. of oxalic acid dihydrazide the 1,3,4-oxdiazole derivative of the Formula

(61)
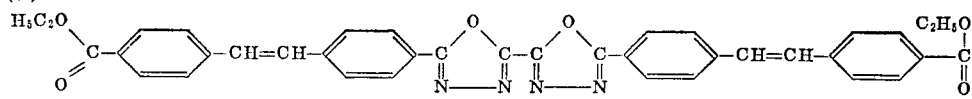

in a yield of 25.9 g. (=81.3% of theory) in the form of a faintly yellowish, finely crystalline powder from ortho-dichlorobenzene, melting at 351 to 352° C.

*Analysis.*—$C_{38}H_{30}O_6N_4$ (molecular weight: 638.65): Calculated (percent): C, 71.46; H, 4.73; H, 8.77. Found (percent): C, 71.43; H, 4.68; N, 8.77.

From 15.8 g. of 4'-carbethoxy-stilbene-4-carboxylic acid chloride and 5.0 g. of thiophene-2,5-dicarboxylic acid dihydrazide the 1,3,4-oxdiazole derivative of the formula

(62)
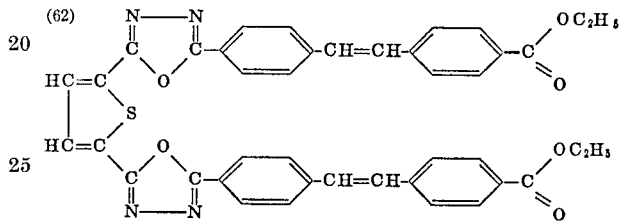

in a yield of 14 g. (=77.9% of theory) in the form of light-yellow, very fine crystals from ortho-dichlorobenzene, melting at 371° to 372° C.

*Analysis.*—$C_{42}H_{32}O_6N_4S$ (molecular weight: 720.80): Calculated (percent): C, 69.99; H, 4.48; N, 7.77. Found (percent): C, 69.87; H, 4.64, N, 7.71.

From 12.2 g. of stilbene-4-carboxylic acid chloride and 50 g. of thiophene-2,5-dicarboxylic acid dihydrazide the 1,3,4-oxdiazole derivative of the formula

(63)
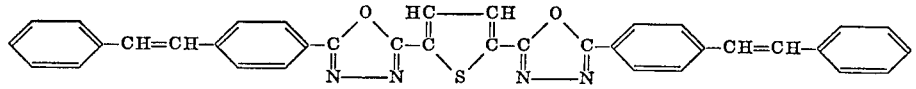

in a yield of 10 g. (=69.6% of theory) in the form of faintly yellowish, very fine, felted crystals from trichlorobenzene, melting at 349° to 350° C.

*Analysis.*—$C_{36}H_{24}O_2N_4S$ (molecular weight: 576.68): Calculated (percent): C, 74.98; H, 4.20; N, 9.72. Found (percent): C, 74.96; H, 4.30; N, 9.80.

EXAMPLE 7

A mixture of 11.9 g. of stilbene-4-carboxylic acid hydrazide, 8.3 g. of cinnamic acid chloride and 8 g. of pyridine in 250 ml. of dry ortho-dichlorobenzene is heated within 20 minutes to 100° to 110° C. while being stirred, then stirred on for 1 hour at this temperature and then heated within 15 to 30 minutes to 165° to 170° C. while being stirred. Within 15 minutes at 165° to 170° 12 g. of thionylchloride are dropped into the vigorously stirred, light-yellow solution. The solution, which by now has become yellow, is stirred on for 5 minutes at this temperature, then cooled to about 5° C. and during the cooling 200 ml. of methanol are added. The resulting 2-[stilbenyl-(4′)]-5-[styryl]-1,3,4-oxdiazole of the formula (64)

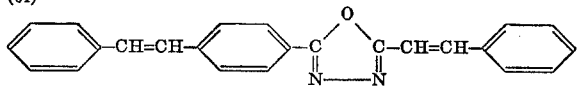

is suction off, washed with methanol and dried, to yield about 10.1 g. (=57.8 % of theory) of a faintly yellowish powder which melts at 186.5° to 187° C. Evaporation of the mother liquor furnishes another 3.6 g. of a product melting at 182° to 183° C., which, after two recrystallizations from tetrachloroethylene with the aid of bleaching earth, forms colourless, fine crystals melting at 187.5° to 188° C.

Analysis.—$C_{24}H_{18}ON_2$ (molecular weight 350.40): Calculated (percent): C, 82.26; H, 5.18; N, 8.00. Found (percent): C, 82.25; H, 5.31; N, 7.77.

The following stilbenyl-1,3,4-oxdiazole derivatives are accessible in a similar manner:

2-[stilbenyl - (4′)] - 5 - [para-methyl-styryl] - 1,3,4-oxdiazole of the formula (65)

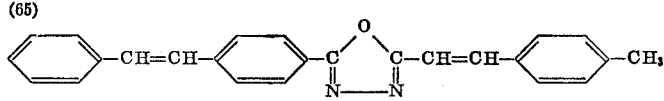

in a yield of 74.6% of the theoretical, in the form of a faintly yellowish, finely crystalline powder from tetrachloroethylene, melting at 203.5° to 204° C.

Analysis.—$C_{25}H_{20}ON_2$ (molecular weight: 364.43): Calculated (percent): C, 82.39; H, 5.53; N, 7.69. Found (percent): C, 82.23; H, 5.55; N, 7.54.

2-[stilbenzyl - (4′)] - 5 - [para-methoxy-styryl]-1,3,4-oxdiazole of the formula (66)

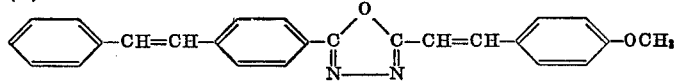

in a yield of 52.2% of the theoretical, in the form of a faintly yellowish, finely crystalline powder from tetrachloroethylene, melting at 194° to 194.5° C.

Analysis.—$C_{25}H_{20}O_2N_2$ (molecular weight: 380.43): Calculated (percent): C, 78.92; H, 5.30; N, 7.36. Found (percent): C, 78.96; H, 5.45; N, 7.19.

2[stilbenyl - (4′)] - 5 - [para-phenyl-styryl] - 1,3,4-oxdiazole of the formula (67)

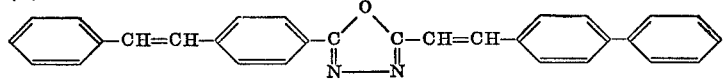

in the form of light-yellow flakes from chlorobenzene, melting at 262° to 263° C.

Analysis.—$C_{30}H_{22}ON_2$ (molecular weight: 426.49): Calculated (percent): C, 84.48; H, 5.20; N, 6.57. Found (percent): C, 84.38; H, 5.31; N, 6.83.

EXAMPLE 8

A mixture of 11.91 g. of stilbene-4-carboxylic acid hydrazide, 11.17 g. of 5-phenyl-thiophene-2-carboxylic acid chloride and 8 g. of pyridine in 200 ml. of anhydrous ortho-dichlorobenzene is heated within 20 minutes to 100 to 110° C. while being stirred, then stirred for another hour at this temperature and then within 15 to 30 minutes heated to 165° to 170° C. In the course of 15 minutes at 165° to 170° C. 12 g. of thionylchloride are dropped into the light-yellow solution. The batch is stirred for another 5 minutes at this temperature, the solution of the reaction product—which has by now turned yellow—is cooled to about 20° C., and the precipitated crystals are suctioned off, washed with methanol and dried, to yield about 16.7 g. (=82.3% of theory) of 2-[stilbenyl - (4′)] - 5 - [5″-phenyl-thienyl-(2″)]-1,3,4-oxdiazole of the formula (68)

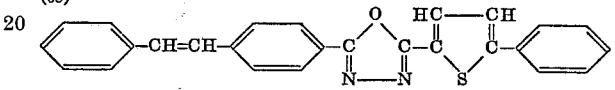

in the form of a pale-yellow powder which melts at 270° C. and after three recrystallizations from tetrachloroethylene forms faintly greenish yellow, fine, felted needles melting at 270° C.

Analysis.—$C_{26}H_{18}ON_2S$ (molecular weight: 406.51): Calculated (percent): C, 76.82; H, 4.46; N, 6.89. Found (percent): C, 76.39; H, 4.50; N, 6.84.

The following 1,3,4-oxidazole derivatives are accessible in a similar manner:

From 97.74 g. of 4′-carbethoxy-stilbene-4-carboxylic acid chloride and 64.46 g. of 5-phenyl-thiophene-2-carboxylic acid hydrazide [obtained by refluxing 1 mol of 5-phenylthiophene-2-carboxylic acid methyl ester for 24 hours with 4 mols of hydrazine hydrate in ethanol; melting at 165.5° to 166.5° C.] with 56 g. of pyridine in 1200 ml. of dry ortho-dichlorobenzene and cyclization with 60 g. of thionylchloride—the 2 - [4″-carbethoxy-stilbenyl-(4′)] - 5 - [5‴ - phenyl-thienyl-(2‴)]-1,3,4-oxdiazole of the formula (69)

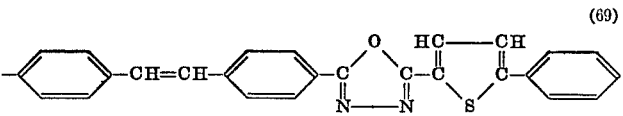

in a yield of 122.2 g. (=85.4% of theory), in light-yellow, very fine crystals from ortho-dichlorobenzene, melting at 294.5° to 295.5° C.

*Analysis.*—C₂₉H₂₂O₃N₂S (molecular weight: 478.57): Calculated (percent): C, 72.78; H, 4.63; N, 5.85. Found (percent): C, 72.66; H, 4.69; N, 5.86.

From 23.83 g. of stilbene-4-carboxylic acid hydrazide and 19.26 g. of thiophene-2,5-dicarboxylic acid monomethyl ester chloride—the 2-[stilbenyl-(4')]-5-[5''-carbomethoxy-thienyl-(2'')]-1,3,4-oxdiazole of the formula

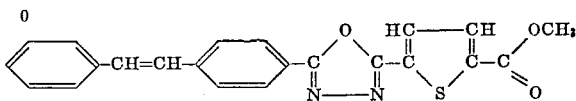

in a yield of 31.0 g. (=82.0% of theory) in light-yellow, vey fine crystals from ortho-dichlorobenzene, melting at 227.5° to 228.5° C.

*Analysis.*—C₂₂H₁₆O₃N₂S (molecular weight: 388.45): Calculated (percent): C, 68.03; H, 4.15; N, 7.21. Found (percent): C, 68.23; H, 3.93; N, 7.22.

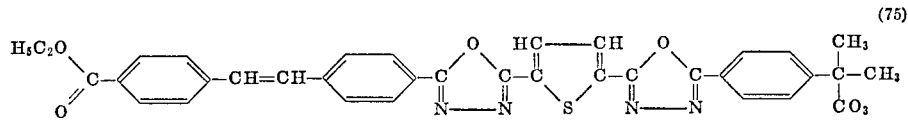

2-[stilbenyl - (4')] - 5 - [thienyl - 2'')]-1,3,4-oxidiazole of the formula

(71)
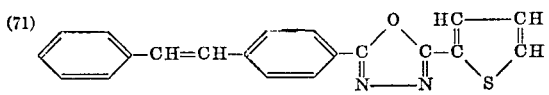

in a yield of 33.3% of the theoretical, in the form of almost colourless, felted needles from dioxane+ethanol +water, melting at 174° to 174.5° C.

*Analysis.*—C₂₀H₁₄ON₂S (molecular weight: 330.41): Calculated (percent): C, 72.70; H, 4.27; N, 8.48. Found (percent): C, 72.53; H, 4.47; N, 8.62.

EXAMPLE 9

6.14 grams of stilbene-4-carboxylic acid chloride, 7.16 g. of 5 - [5' - phenyl-(1'')-1',3',4'-oxdiazolyl-(2')]-thiophene-2-carboxylic acid hydrazide of the formula

(72)
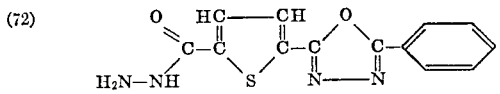

[prepared from 5-5' - phenyl - (1'') - 1',3',4'-oxdiazolyl-(2')]-thiophene-2-carboxylic acid methyl ester and hydrazine hydrate with heating; melting at 228° to 229.5° C.] and 8 g. of pyridine in 200 ml. of anhydrous ortho-dichlorobenzene are heated within 20 minutes to 100° to 110° C. while being stirred, then stirred for another hour at this temperature and then heated within 15 to 30 minutes to 165° to 170° C. The yellow suspension of the reaction product is mixed dropwise with 10 g. of thionylchloride within 15 minutes while being vigorously stirred at 165° to 170° C., whereupon a solution gradually forms, which is stirred on for 5 minutes at this temperature, then cooled to about 15° C. and 200 ml. of methanol are added. The 1,3,4-oxdiazole derivative of the formula is suctioned off, washed with methanol and dried, to yield about 7.5 g. (=63.2% of theory) of a light-yellow powder which melts at 293° to 294° C. and, after three recrystallizations from ortho-dichlorobenzene with the aid of bleaching earth, forms light-yellow, fine crystals melting at 298° to 299° C.

*Analysis.*—C₂₈H₁₈O₂N₄S (molecular weight: 474.54): Calculated (percent): C, 70.87; H, 3.82; N, 11.81. Found (percent): C, 70.69; H, 4.03; N, 11.71.

The following 1,3,4-oxdiazole derivatives are accessible in a similar manner:

(74)
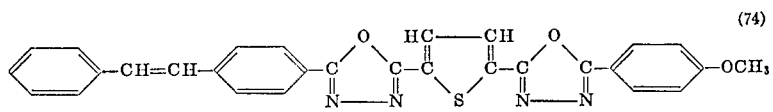

in a yield of 10.5 g. (= 83.4% of theory). Light-yellow, fine needles from ortho-dichlorobenzene, melting at 305° to 306° C.

*Analysis.*—C₂₉H₂₀O₃N₄S (molecular weight: 504.57): Calculated (percent): C, 69.03; H, 4.00; N, 11.10. Found (percent): C, 68.84; H, 4.18; N, 11.07.

(75)

in a yield of 12.8 g. (=85.2% of theory). Light-yellow, finely crystalline powder from ortho-dichlorobenzene, melting at 313° to 314° C.

*Analysis.*—C₃₅H₃₀O₄N₄S (molecular weight: 602.71): Calculated (percent): C, 69.75; H, 5.02; N, 9.30. Found (percent): C, 69.68; H, 5.12; N, 9.58.

EXAMPLE 10

5.96 grams of stilbene-4-carboxylic acid hydrazide, 6.6 g. of 5-[benzoxazolyl-(2')]-thiophene-2-carboxylic acid chloride of the formula

(76)
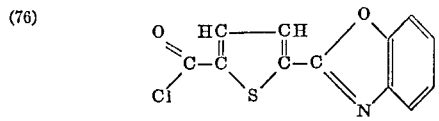

and 8 g. of pyridine in 250 ml. of anhydrous ortho-dichlorobenzene are heated within 20 minutes to 100° to 110° C. while being stirred, then stirred on for one hour at this temperature and then heated within 15 to 30 minutes to 165° to 170° C. While vigorously stirring the colourless suspension of the reaction product at 165° to 170° C., 12 g. of thionylchloride are dropped in within 15 minutes, whereupon gradually a yellow, clear solution forms which is stirred on for 5 minutes at this temperature, then cooled to about 15° C. and 200 ml. of methanol are added. The 1,3,4-oxdiazole derivative of the formula

(77)
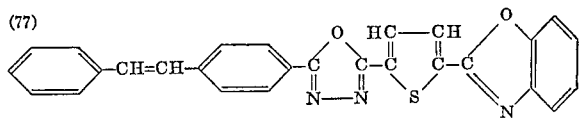

is suctioned off, washed with methanol and dried, to yield about 8.3 g. (=74.3% of theory) of a light-yellow powder

(73)
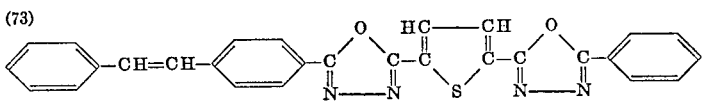

which melts at 285° to 286° C. Evaporation of the mother liquor furnishes another 2 g. of a product melting at 279° to 284° C. which, after three recrystallizations from orthodichlorobenzene, forms fine, felted, light-yellow needles melting at 288° to 289° C.

*Analysis.*—C$_{27}$H$_{17}$O$_2$N$_3$S (molecular weight: 447.52): Calculated (percent): C, 72.47; H, 3.83; N, 9.39. Found (percent): C, 72.27; H, 3.75; N, 9.44.

The 1,3,4-oxdiazole derivative of the formula

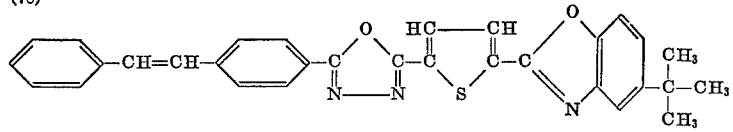
(78)

is obtained in a similar manner in a yield of 5.7 g. (=45.3% of theory), in the form of light-yellow, fine needles from tetrachloroethylene, melting at 287° to 288.5° C.

*Analysis.*—C$_{31}$H$_{25}$O$_2$N$_3$S (molecular weight 503.62): Calculated (percent): C, 73.93; H, 5.00; N, 8.34. Found (percent): C, 74.07; H, 5.08; N, 8.54.

The 5-[benzoxazolyl-(2')]-thiophene-2-carboxylic acid chloride of the Formula 76 used as starting material can be prepared thus:

A mixture of 579 g. of 5-[benzoxazolyl-(2')]-thiophene-2-carboxylic acid, 3.5 litres of chlorobenzene, 250 ml. of thionylchloride and 10 ml. of dimethylformamide is refluxed for 2 hours. Then another 250 ml. of thionylchloride are added and the whole is refluxed for a further 2 hours. The excess thionylchloride and about half the solvent are distilled off, and the distillation residue is filtered off while still hot and allowed to cool. The 5-[benzoxazolyl-(2')]-thiophene-2-carboxylic acid chloride of the Formula 76 crystallizes out and is suctioned off, washed with n-hexane and dried, to yield 530 g. (=83.8% of theory) of faintly yellowish crystals melting at 163° to 164° C. which, after recrystallization from chlorobenzene, reveal the following analytical values:

C$_{17}$H$_6$O$_2$N$_6$SCl (molecular weight: 263.70).—Calculated (percent): C, 54.66; H, 2.29; Cl, 13.44. Found (percent): C, 54.36; H, 2.11; Cl, 13.34.

The 5-[5'-tertiary butyl-benzoxazolyl-(2')]-thiophene-2-carboxylic acid chloride used as starting material may be prepared in a similar manner. It forms pale-yellow, shiny crystals from ligroin, melting at 176° to 178° C.

*Analysis.*—C$_{16}$H$_{14}$O$_2$NSCl (molecular weight: 319.81): Calculated (percent): C, 60.09; H, 4.41; N, 4.38; Cl, 11.09. Found (percent): C, 60.17; H, 4.33; N, 4.25; Cl, 11.24.

EXAMPLE 11

A mixture of 3.19 g. of 4'-phenyl-stilbene-4-carboxylic acid chloride, 1.36 g. of benzoic acid monohydrazide, 1.6 g. of pyridine and 100 ml. of dry ortho-dichlorobenzene is heated within 15 minutes to 100° to 110° C. while being stirred, further stirred for 1 hour at this temperature and then within 10 to 20 minutes heated to 130° to 135° C. The pale-yellow suspension is mixed dropwise with 2.5 ml. of thionylchloride within 30 minutes at 130° to 135° C. The resulting light-yellow solution is stirred for another 30 minutes at this temperature, then cooled to about 5° C. and during the cooling 200 ml. of methanol are added. After suctioning, washing with methanol and drying there are obtained about 3.5 g. (=87.5% of theory) of 2-[4''-phenyl-stilbenyl-(4')]-5-phenyl-1,3,4-oxdiazole of the formula

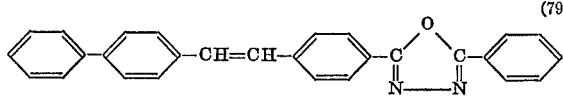
(79)

in the form of a pale-yellow powder which melts at 209° to 210° C. and after three recrystallizations from tetrachloroethylene with the aid of bleaching earth furnishes about 2.0 g. (=50.3% of theory) of pale-yellow, shiny needles and flakes melting at 222° to 222.5° C.

*Analysis.*—C$_{28}$H$_{20}$ON$_2$ (molecular weight: 400.46): Calculated (percent): C, 83.97; H, 5.03; N, 7.00. Found (percent): C, 84.01; H, 5.19; N, 6.84.

The following stilbenyl-1,3,4-oxdiazole derivatives are accessible in a similar manner:

2-[4''-phenyl-stilbenyl-(4')]-5-[4'''-tertiary butyl phenyl-(1''')]-1,3,4-oxdiazole of the formula

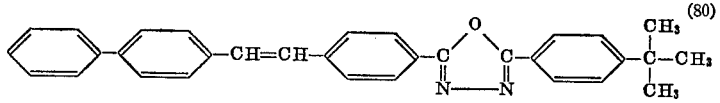
(80)

in a yield of 78.9% of the theoretical, in pale greenish, shiny needles from tetrachloroethylene, melting at 239° to 239.5° C.

*Analysis.*—C$_{35}$H$_{28}$ON$_2$ (molecular weight: 456.56): Calculated (percent): C, 84.18; H, 6.18; N, 6.14. Found (percent): C, 84.36; H, 6.28; N, 5.94.

2-[4''-phenyl - stilbenyl - (4')] - 5 - [4''' - biphenylyl-(1''')]-1,3,4-oxdiazole of the formula

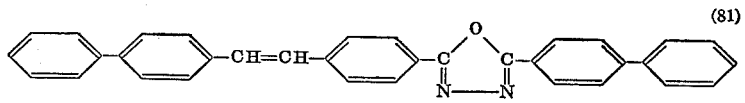
(81)

in a yield of 83.9% of the theoretical, in pale yellow, shiny flakes from ortho-dichlorobenzene, melting at 282° to 283° C.

*Analysis.*—C$_{34}$H$_{24}$ON$_2$ (molecular weight: 476.55): Calculated (percent): C, 85.69; H, 5.08; N, 5.88. Found (percent): C, 85.93; H, 5.38; N, 5.65.

2-[4'' - phenyl - stilbenyl - (4')]-5-[stilbenyl-(4''')]-1,3,4-oxdiazole of the formula

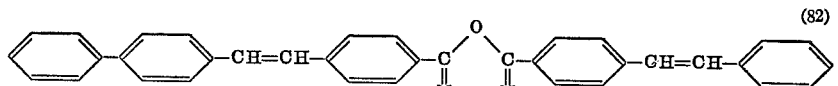
(82)

in a yield of 73.7% of the theoretical, in pale greenish yellow, shiny flakes and needles from ortho-dichlorobenzene, melting at 304° to 305° C.

Analysis.—$C_{36}H_{26}ON_2$ (molecular weight: 502.58): Calculated (percent): C, 86.03; H, 5.21; N, 5.57. Found (percent): C, 85.85; H, 5.41; N, 5.40.

(83)

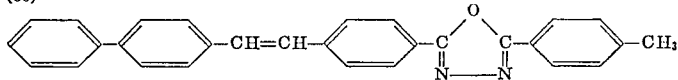

in a yield of 82.7% of the theoretical, in pale green, shiny tinsel, from ortho-dichlorobenzene, melting at 239° to 239.5° C.

Analysis.—$C_{29}H_{22}ON_2$ (molecular weight: 414.48): Calculated (percent): C, 84.03; H, 5.35; N, 6.76. Found (percent): C, 83.82; H, 5.47; N, 6.83.

2 - [4″ - phenyl-stilbenyl-(4′)]-5-[4‴-methoxyphenyl-(1‴)]-1,3,4-oxdiazole of the formula (84)

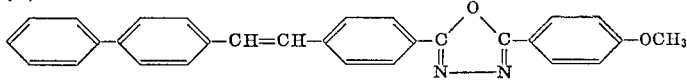

in a yield of 83.6% of the theoretical, in pale green, shiny flakes and needles from ortho-dichlorobenzene, melting at 225.5° to 227° C.

Analysis.—$C_{29}H_{22}O_2N_2$ (molecular weight: 430.48): Calculated (percent): C, 80.90; H, 5.15; N, 6.51. Found (percent): C, 80.61; H, 5.23; N, 6.33.

2 - [4″ - phenyl-stilbenyl-(4′)]-5-[2‴-methoxyphenyl-(1‴)]-1,3,4-oxdiazole of the formula (85)

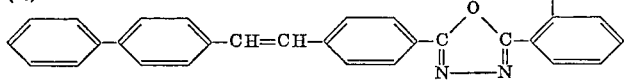

in a yield of 55.8% of the theoretical, in pale yellow, fine needles from tetrachloroethylene, melting at 194.5° to 195° C.

Analysis.—$C_{29}H_{22}O_2N_2$ (molecular weight: 430.48): Calculated (percent): C, 80.90; H, 5.15; N, 6.51. Found (percent): C, 80.77; H, 5.21; N, 6.57.

2 - [4″ - phenyl-stilbenyl-(4′)]-5-[3‴,4‴-di-methoxyphenyl-(1‴)]-1,3,4-oxdiazole of the formula (86)

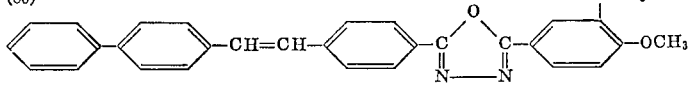

in a yield of 51.0% of the theoretical, in light-yellow, felted needles from tetrachloroethylene, melting at 228° to 229° C.

Analysis.—$C_{30}H_{24}O_3N_2$ (molecular weight: 460.51): Calculated (percent): C, 78.24; H, 5.25; N, 6.08. Found (percent): C, 77.70; H, 5.28; N, 6.17.

2 - [4‴-phenyl-stilbenyl-(4′)]-5-[naphthyl-(2‴)]-1,3,4-oxdiazole of the formula (87)

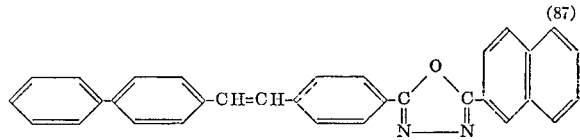

in a yield of 88.8% of the theoretical, in faintly greenish yellow, shiny flakes and needles from ortho-dichlorobenzene, melting at 265° to 265.5° C.

Analysis.—$C_{32}H_{22}ON_2$ (molecular weight: 450.51): Calculated (percent): C, 85.31; H, 4.92; N, 6.22. Found (percent): C, 85.05; H, 5.04; N, 6.27.

2 - [4″ - phenyl - stilbenyl - (4′)] - 5-[thienyl-2‴)]-1,3,4-oxdiazole of the formula (88)

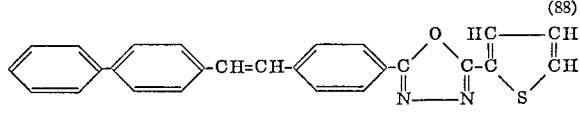

in a yield of 85.0% of the theoretical, in pale greenish yellow, felted flakes from tetrachloroethylene, melting at 219° to 219.5° C.

Analysis.—$C_{26}H_{18}ON_2S$ (molecular weight: 406.51): Calculated (percent): C, 76.82; H, 4.46; N, 6.89. Found (percent): C, 76.74; H, 4.45; N, 6.95.

2 - [4″ - phenyl-stilbenyl-(4′)]-5-[5‴-phenyl-thienyl-(2‴)]-1,3,4-oxdiazole of the formula (89)

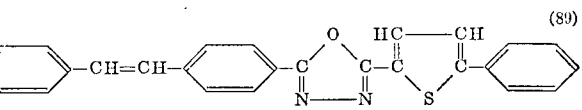

in a yield of 82.9% of the theoretical, in light, greenish yellow, shiny flakes from ortho-dichlorobenzene, melting at 286.5° to 287.5° C.

*Analysis.*—C$_{32}$H$_{22}$ON$_2$S (molecular weight: 482.61): Calculated (percent): C, 79.64; H, 4.60; N, 5.80. Found (percent): C, 79.46; H, 4.68; N, 6.03.

2 - [4'' - phenyl - stilbenyl - (4')] - 5 - [furyl-(2''')]-1,3,4-oxdiazole of the formula (90)

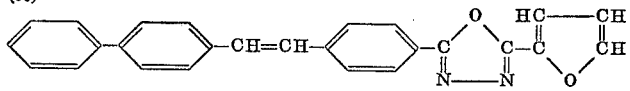

in a yield of 69.2% of the theoretical, in pale yellowish, fine, felted needles from tetrachloroethylene, melting at 220° to 220.5° C.

*Analysis.*—C$_{26}$H$_{18}$O$_2$N$_2$ (molecular weight: 390.42): Calculated (percent): C, 79.68; H, 4.65; N, 7.17. Found (percent): C, 79.61; H, 4.64; N, 7.21.

Stilbenyl-1,3,4-oxdiazole derivative of the formula (91)

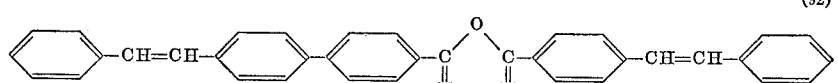

in a yield of 94.7% of the theoretical, in pale greenish, yellow, felted needles from ortho-dichlorobenzene, melting at 351° to 352° C.

*Analysis.*—C$_{35}$H$_{23}$O$_2$N$_3$ (molecular weight: 517.59): Calculated (percent): C, 81.22; H, 4.48; N, 8.12. Found (percent): C, 80.99; N, 4.60; N, 7.85.

The 4'-phenyl-stilbene-4-carboxylic acid chloride used as starting material is obtained in a substantially quantitative yield by boiling 4'-phenyl-stilbene-4-carboxylic acid with excess thionylchloride in ortho-dichlorobenzene; it forms greenish yellow crystals melting at 220° to 221° C.

4'-phenyl-stilbene-4-carboxylic acid can be prepared, for example, from 4-formyl-diphenyl and 4-carbmethoxy-benzylchloride by the Wittig method. From glacial acetic acid it crystallizes in the form of light, greenish yellow crystals melting at 312° C.

*Analysis.*—C$_{21}$H$_{16}$O$_2$ (molecular weight: 300.34): Calculated (percent): C, 83.98; H, 5.37. Found (percent): C, 84.19; H, 5.42.

EXAMPLE 12

A mixture of 6.0 g. of 4'-(styryl-biphenyl)-4-carboxylic acid, 70 ml. of ortho-dichlorobenzene, two drops of pyridine and 20 ml. of thionylchloride is stirred for 6 hours at 80° to 90° C.; hydrochloric acid gas escapes and a clear solution forms. The excess thionylchloride is then expelled under vacuum. At a temperature from 30° to 40° C. 4.8 g. of stilbene-4-carboxylic acid hydrazide and 2 ml. of anhydrous pyridine are added, and the light-yellow suspension is heated for 90 minutes at 130° to 135° C., whereupon a thick paste is obtained. Within 20 minutes at this temperature 5 ml. of thionylchloride are dropped in at an even speed, during which hydrochloric acid gas escapes and a thin, yellow suspension is obtained which is then stirred on for 20 minutes at 130 to 135° C.; the bulk of the solvent is expelled by evacuation, alcohol is added, and the batch is allowed to cool while being stirred.

The crystalline magma is suctioned off and washed with alcohol. Two recrystallizations from dimethylformamide furnish about 3.1 g. of the compound of the formula (92)

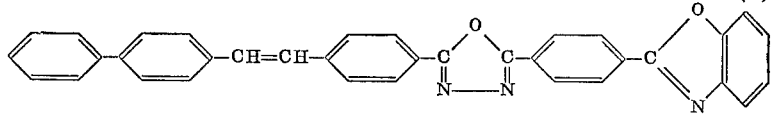

in the form of light-yellow flakes melting at 306° to 307° C.

*Analysis.*—C$_{36}$H$_{26}$ON$_2$ (molecular weight: 502.58): Calculated (percent): C, 86.03; H, 5.21; N, 5.57. Found (percent): C, 85.76; H, 5.45; N, 5.63.

The following oxidiazole compounds may be prepared in a similar manner:

(93)

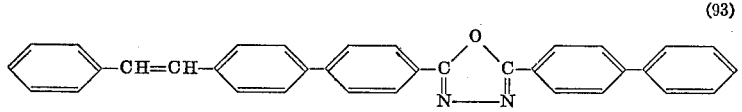

Pale yellow crystal powder from chlorobenzene, melting at 285° to 287° C.

*Analysis.*—C$_{34}$H$_{24}$ON$_2$ (molecular weight: 476.55): Calculated (percent): C, 85.69; H, 5.08; N, 5.88. Found (percent): C, 85.43; H, 4.97; N, 5.72.

(94)

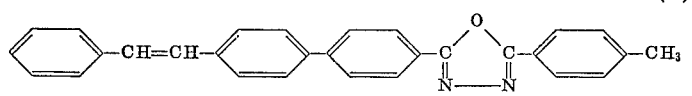

Pale yellow, finely crystalline powder from dimethylformamide, melting at 258° to 260° C.

*Analysis.*—C$_{29}$H$_{22}$ON$_2$ (molecular weight: 414.48): Calculated (percent): C, 84.03; H, 5.35; H, 6.76. Found (percent): C, 83.71; H, 5.32; N, 6.89.

(95)

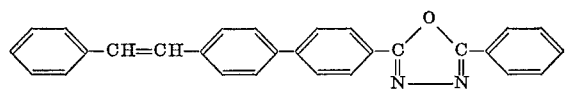

Pale yellow flakes from dimethylformamide, melting at 232° to 234° C.

*Analysis.*—C$_{28}$H$_{20}$ON$_2$ (molecular weight: 400.46): Calculated (percent): C, 83.97; H, 5.03; N, 7.00. Found (percent): C, 83.68; H, 5.16; N, 7.06.

The 4'-(styryl-biphenyl)-4-carboxylic acid used as starting material may be prepared as follows:

A mixture of 213 g. of 4'-amino-diphenyl-4-carboxylic acid, 500 g. of glacial acetic acid, 220 g. of concentrated hydrochloric acid, 400 g. of ice and 300 ml. of water is stirred. Within 8 hours a solution of 70 g. of sodium nitrite in 140 ml. of water is dropped in, while keeping the temperature of the reaction mixture at 0° to 5° C. by cooling with ice. The thickly liquid crystal magma is then stirred overnight at this temperature. A cooled solution of 148 g. of cinnamic acid in 1800 ml. of acetone is then tipped in while stirring well, and the resulting suspension is adjusted to pH=3.0 to 3.5 by means of about 130 ml. of sodium hydroxide solution. In the course of 5 to 6 hours at 0° to 5° C. 90 to 100 g. of an equimolecular mixture of copper and cupric chloride are then added in portions, whereupon no more gas is being evolved. The temperature of the reaction mixture is then allowed to rise to 20° C., and the acetone is distilled off with steam. About 600 ml. of concentrated ammonia solution are then added to the hot batch which is then allowed to cool while being stirred, suctioned and rinsed with water. The residue is then mixed at the boil with 3 liters of water, and concentrated hydrochloric acid is added until a strong acid reaction to Congo red has been established. The product is suctioned off and washed with hot water and dried, to yield 119 g. of a brown-beige coloured powder which is dissolved in much boiling dioxan. The undissolved residue is filtered off, and the filtrate is concentrated and allowed to cool.

There are obtained 55 g. of a light-brown, crystalline powder which melts unsharply between 315° and 325° C. On two further recrystallizations from dioxan with addition of active carbon it yields the 4'-(styryl-biphenyl)-4-carboxylic acid in the form of pale beige coloured flakes melting at 328° to 329° C.

Sublimation in a high vacuum furnishes a colourless powder of the identical melting point.

Analysis.—$C_{21}H_{16}O_2$ (molecular weight: 300.34): Calculated (percent): C, 83.98; H, 5.37; O, 10.65. Found (percent): C, 83.99; H, 5.30; O, 10.82.

EXAMPLE 13

A mixture of 2.92 g. of the acid chloride of the formula

(96)
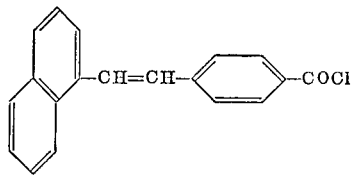

1.92 g. of 4-tertiary butyl-benzhydrazide and 1.6 g. of pyridine in 100 ml. of anhydrous ortho-dichlorobenzene is heated within 35 minutes to 130° C. while being stirred. The light-yellow solution is mixed within 25 minutes dropwise with 2.5 ml. of thionylchloride, then heated within 30 minutes to 145° C., concentrated under vacuum to 20 ml., and the crystals formed on cooling are suspended in 30 ml. of methanol, suctioned off, washed with methanol and dried, to yield about 3.4 g. (=79.5% of theory) of the compound of the formula

(97)
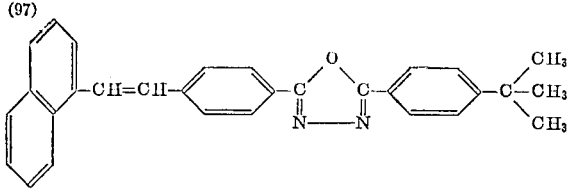

in the form of a beige coloured powder which melts at 157° to 159° C. and, after two recrystallizations from tetrachloroethylene with the aid of bleaching earth, yields 1.3 g. (=30% of theory) of colourless, shiny flakes melting at 169.3° to 169.7° C.

Analysis.—$C_{30}H_{26}ON_2$ (molecular weight: 430.52): Calculated (percent): C, 83.69; H, 6.09; N, 6.51. Found (percent): C, 83.60; H, 6.13; N, 6.34.

The compound of the formula

(98)
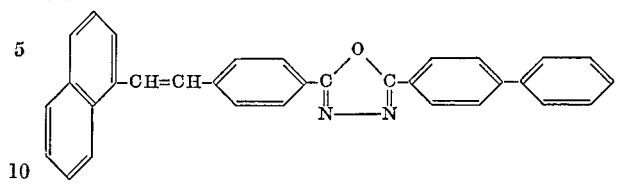

may be prepared in a similar manner. Yield: 54% of theory. Light, greenish yellow, fine needles from tetrachloroethylene, melting at 211.0° to 211.3° C.

Analysis.—$C_{32}H_{22}ON_2 \cdot 1/20$ mol tetrachloroethylene (molecular weight: 458.82): Calculated (percent): C, 84.02; H, 4.83; N, 6.11; Cl, 1.55. Found (percent): C, 83.71; H, 4.90; N, 6.01; Cl, 1.99.

The acid chloride used as starting material is accessible from the corresponding carboxylic acid (which itself is obtained by the Wittig method from 1-naphthaldehyde and 4-carbomethoxy-benzylchloride) by boiling in orthodichlorobenzene with excess thionylchloride in a practically quantitative yield. The acid chloride settles out from tetrachloroethylene in yellow crystals melting at 108° to 109° C.

Analysis.—$C_{19}H_{13}OCl$ (molecular weight: 292.77): Calculated (percent): C, 77.95; H, 4.48; Cl, 12.11. Found (percent): C, 77,68; H, 4.46; Cl, 12.16.

EXAMPLE 14

A mixture of 2.92 g. of the acid chloride of the formula

(99)
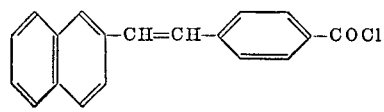

1.92 of 4-tertiary butylbenzhydrazide and 1.6 g. of pyridine in 100 ml. of anhydrous ortho-dichlorobenzene is heated within 20 minutes to 135° C. The light-yellow suspension is then mixed dropwise within 22 minutes with 2.5 ml. of thionylchloride, the yellow solution is heated within 30 minutes to 148° C. and then cooled to 0° C. After suctioning, washing with methanol and drying, there are obtained 3.05 g. (=69.5% of theory) of the compound of the formula (100)
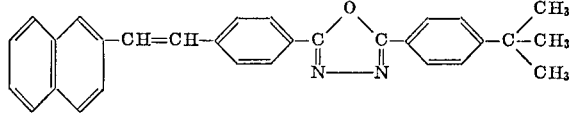

in the form of a cream coloured powder which melts at 208° to 210° C. and after two recrystallizations from tetrachloroethylene with the aid of bleaching earth yields about 1.5 g. (=34.4% of theory) of faintly greenish yellow, felted needles melting at 208.2° to 208.5° C.

Analysis.—$C_{30}H_{26}ON_2$ (molecular weight 430.52): Calculated (percent): C, 83.69; H, 6.09; N, 6.51%. Found (percent): C, 83.76; H, 6.09; N, 6.52.

In a similar manner the following oxdiazoles may be prepared:

(101)
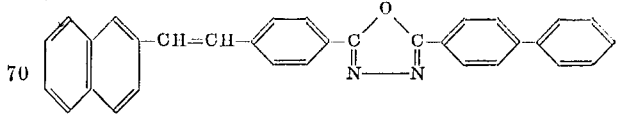

in a yield of 60.7% of the theoretical. Pale yellow, shiny flakes from ortho-dichlorobenzene, melting at 255° to 256° C.

*Analysis.*—$C_{32}H_{22}ON_2$ (molecular weight: 450.51): Calculated (percent): C, 85.31; H, 4.92; N, 6.22. Found (percent): C, 85.25; H, 5.03; N, 6.43.

(102)

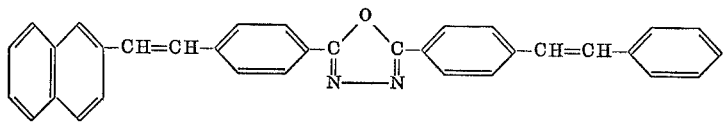

in a yield of 63.5% of the theoretical. Almost colourless, felted crystals from ortho-dichlorobenzene, melting at 267° to 268° C.

*Analysis.*—$C_{34}H_{24}ON_2$ (molecular weight: 476.55): Calculated (percent): C, 85.69; H, 5.08; N, 5.88. Found (percent): C, 85.97; H, 5.21; N, 5.82.

The acid chloride used as starting material may be obtained from the corresponding carboxylic acid (which itself is prepared by the Wittig method from 2-naphthaldehyde and 4-carbomethoxybenzylchloride) by boiling in ortho-dichlorobenzene with excess thionylchloride in a practically quantitative yield. It settles out from tetrachloroethylene in faintly yellowish crystals melting at 154° to 156° C.

*Analysis.*—$C_{19}H_{13}OCl$ (molecular weight: 292.77): Calculated (percent): C, 77.95; H, 4.48; Cl, 12.11. Found (percent): C, 78.08; H, 4.41; Cl, 12.51.

EXAMPLE 15

100 grams of polyester granulate from terephthalic acid ethyleneglycol polyester are intimately mixed with 0.05 g. of the compound of the Formula 53 and melted at 285° C. while being stirred. The spinning mass is spun through conventional spinnerets and the filaments formed are stretched. Strongly brightened polyester fibres are obtained.

Alternatively, the compound of the Formula 53 may be added to the starting materials before or during the polycondensation leading to the polyester.

Good brightening effects are also obtained if the compound of the Formula 53 is replaced by any one compound of the following Formulae: 39, 45, 49, 51, 52, 57, 59, 60, 61, 68, 73, 74, 75, 78, 79, 80, 81, 82, 87, 91, 92, 93, 95, 98, 101 or 102.

EXAMPLE 16

A bleached woven fabric from polyamide staple fibre (nylon spun) is treated at a goods-to-liquor ratio of 1:30 for 30 minutes at 90° to 95° C. in a bath which contains, referred to the weight of the fibrous material, 0.1% of the compound of the Formula 64 and 1% of acetic acid of 40% strength. After having been rinsed and dried, the fabric thus treated has a strongly brightened aspect.

If the fabric from polyamide staple fibres is replaced by a fabric from polyamide filament, a similar, good brightening effect is achieved.

Equally good brightening effects are achieved when the compound of the Formula 64 is replaced by any one compound of the following Formulae: 37, 40, 58, 59, 65, 66, 67, 70, 71, 79, 80, 81, 83, 84, 85, 88, 97 or 100.

EXAMPLE 17

10 kilograms of a polyamide in chip form, prepared from hexamethylenediamine adipate in known manner, are mixed for 12 hours in a tumbler with 30 g. of titanium dioxide (rutile modification) and 5 g. of one of the compounds of the Formulae 37, 39, 45, 48, 49, 51, 52, 53, 54, 56, 57, 58, 59, 60, 61, 64, 67, 79, 80, 81, 82, 83, 84, 87, 88, 89, 91, 92, 93, 94, 95, 97, 100, 101 or 102. The chips treated in this manner are then melted in a boiler from which the atmospheric oxygen has been displaced by steam and which is heated at 300 to 310° C. by means of oil or diphenyl vapour, and the melt is stirred for half an hour. The melt is then expressed under a nitrogen pressure of 5 atmospheres (gauge) through a spinneret and the resulting filament is cooled and then wound on a spinning bobbin. The resulting threads display an excellent brightening effect which has good fastness to washing and light.

If the above polyamide prepared from hexamethylenediamine adipate is replaced by an ε-caprolactam polyamide, similar, good results are achieved.

EXAMPLE 18

A polyester fabric (for example "Dacron") is padded at room temperature (about 20° C.) with an aqueous dispersion containing per litre 0.1 to 1 g. of one of the oxdiazole compounds of the Formulae 37, 39, 45, 49, 53, 57, 61, 80, 81, 82, 91, 92, 93, 98, 100, 101 or 102 and 1 g. of an adduct from about 35 mols of ethylene oxide with 1 mol of octadecyl alcohol, and the fabric is then dried at about 100° C. The dry fabric is subjected for 30 seconds to a heat treatment at about 220° C. The polyester fabric treated in this manner has a substantially higher white content than an untreated polyester fabric.

EXAMPLE 19

A bleached fabric from polyamide staple fibre (nylon spun) is padded at room temperature (about 20° C.) with an aqueous dispersion containing per litre 0.1 g. to 1 g. of the oxdiazole compound of the Formula 58 or 80 and 1 g. of an adduct from about 35 mols of ethylene oxide with 1 mol of octadecyl alcohol, and the fabric is dried at about 80° C. The dry material is then subjected for 3 minutes to a heat treatment at about 160° C. The polyamide fabric treated in this manner has a substantially higher white content than an untreated polyamide fabric.

When the fabric from polyamide staple fibre is replaced by a fabric from polyamide filament, similar, good brightening effects are obtained.

EXAMPLE 20

100 grams of polypropylene (fibre grade) are intimately mixed with 0.08 g. of the compound of the Formula 58 and melted at 280 to 290° C. while being stirred. The melt is spun by a usual melt spinning process through conventional spinnerets and stretched. Strongly brightened polypropylene fibres are thus obtained.

If the compound of the Formula 58 is replaced by any one compound of the Formulae 54, 67, 79, 81, 82, 92, 98 or 101 good brightening effects are likewise obtained.

EXAMPLE 21

A fabric from polyvinylchloride fibres ("Thermovyl") is padded at room temperature (about 20° C.) with an aqueous dispersion containing per litre 0.1 to 1 g. of the oxdiazole compound of the Formuale 58, 64, 65, 67, 79, 80 or 94 and 1 g. of an adduct from about 35 mols of ethylene oxide with 1 mol of octadecyl alcohol and then dried at about 70° C. The dry material is then subjected for 1 minute to a heat treatment at 100° C. The fabric from polyvinylchloride fibres treated in this manner has a substantially higher white content than an untreated fabric from polyvinylchloride fibres.

EXAMPLE 22

A soap (sodium salt of higher fatty acids) is prepared which contains 0.5% of the compound of the Formula 37 or 0.5% of the compound of the Formula 53.

A polyamide fabric, washed for 30 minutes at 60° to 70° C. with either of these soaps, has a brighter aspect than material washed with a soap that does not contain the compound of the Formula 37 or 53.

If the soap defined above is replaced by an anionic, nonionic or cationic, liquid or solid synthetic detergent, similar white effects are obtained.

We claim:

1. A stilbenyl-derivative having the formula

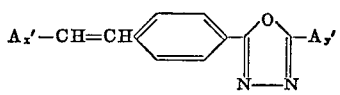

wherein $A_y'$ represents a member selected from the group consisting of phenyl, diphenylyl-(4), β-naphthyl, stilbenyl-(4), β-styryl, thienyl-(2), 5-phenyl-thienyl-(2), furyl-(2), 4-[benzoxazolyl - (2)] - phenyl, 4-[naphthoxazolyl-(2)]-phenyl, 5-[benzoxazolyl-(2)]-thienyl-(2), a radical of the formulae

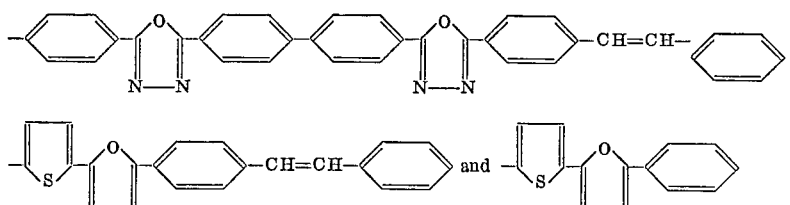

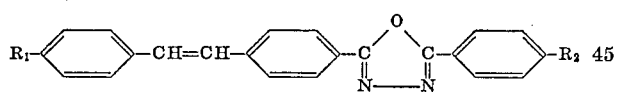

$A_x'$ represents

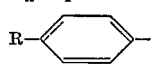

wherein R is hydrogen, an alkyl group having 1 to 4 carbon atoms, methoxy, halogen, phenyl or carbalkoxy with 1 to 4 carbon atoms in the alkyl group, and wherein terminal benzene rings and thienyl residue of the residue $A_y'$ are unsubstituted or substituted with alkyl having 1 to 4 carbon atoms, methoxy, halogen, carbalkoxy with 1 to 4 carbon atoms in the alkyl group or phenyl.

2. A stilbenyl-1,3,4-oxdiazole according to claim 1 having the formula

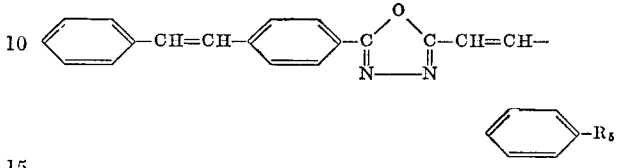

where $R_1$ represents hydrogen or carbalkoxy containing up to 4 carbon atoms in the alkyl grouping, and $R_2$ stands for a member selected from the group consisting of hydrogen, an alkyl group containing 1 to 4 carbon atoms, phenyl and 5-[diphenylyl-(4)]-oxdiazol-1,3,4-yl-(2).

3. A stilbenyl-1,3,4-oxdiazole derivative according to claim 1 having the formula

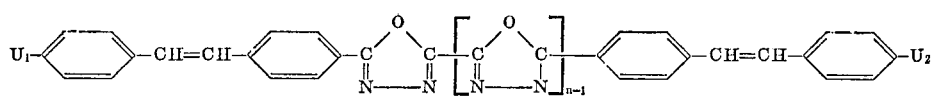

where n stands for the whole number 2, and $U_1$ and $U_2$ each stands for hydrogen or a carboxylic acid alkyl ester group containing up to 4 carbon atoms in the alkyl portion.

4. A stilbenyl-1,3,4-oxdiazole derivative according to claim 1 having the formula

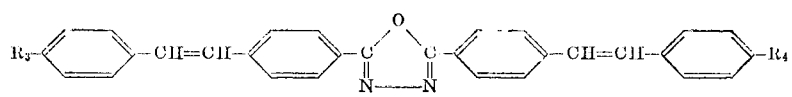

where $R_3$ and $R_4$ each represents a member selected from the group consisting of hydrogen, an alkyl group containing 1 to 4 carbon atoms, carbalkoxy containing up to 2 carbon atoms in the alkyl grouping, chlorine, phenyl and a methoxy group.

5. A stilbenyl-1,3,4-oxdiazole derivative according to claim 1 having the formula

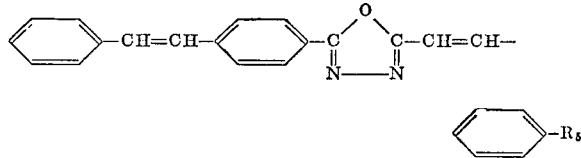

where $R_5$ represents a member selected from the group consisting of hydrogen, alkyl having 1 to 4 carbon atoms, methoxy and phenyl.

6. A stilbenyl-1,3,4-oxdiazole according to claim 1 having the formula

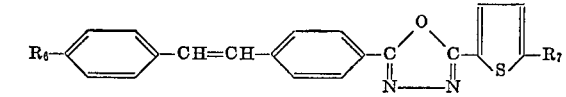

where $R_6$ represents hydrogen, carbalkoxy containing 1 to 2 carbon atoms in the alkyl grouping, and $R_7$ stands for hydrogen, a carbalkoxy group containing 1 to 2 carbon atoms in the alkyl grouping, 2-(5-alkylbenzoxazolyl) having 1–4 carbon atoms in the alkyl grouping, phenyl, or 5-(phenyl)-oxdiazol-1,3,4-yl-(2) wherein the 5-phenyl group may be substituted by methoxy or alkyl with up to 4 carbon atoms.

7. A stilbenyl-1,3,4-oxdiazole derivative according to claim 1 having the formula

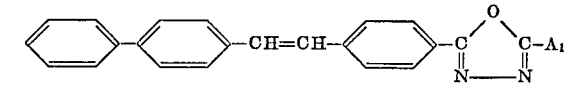

wherein $A_1$ represents a member selected from the group consisting of diphenylyl-(4), β-naphthyl, stilbenyl-(4), thienyl-(2), 5-phenyl-thienyl-(2), furyl - (2), 4 - [benzoxazolyl-(2)]-phenyl and phenyl which may be substituted by alkyl having 1–4 carbon atoms or methoxy.

8. A stilbenyl-1,3,4-oxdiazole having the formula

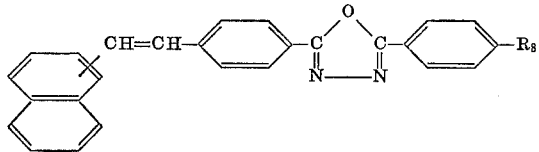

where $R_8$ represents a member selected from the group consisting of hydrogen, an alkyl group containing 1 to 4 carbon atoms, phenyl and β-styryl.

9. A stilbenyl-1,3,4-oxdiazole having the formula

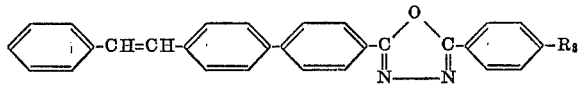

where $R_8$ represents a member selected from the group consisting of hydrogen, an alkyl group containing 1 to 4 carbon atoms, phenyl and β-styryl.

10. A stilbenyl-1,3,4-oxdiazole derivative according to claim 1 of the formula

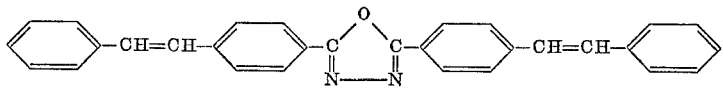

wherein $R_1$ represents hydrogen or carbalkoxy containing up to 4 carbon atoms in the alkyl grouping and $A_2$ stands for naphth(2:1)oxazolyl - (2'7)- or benzoxazolyl(2) which may be substituted in position 5 by alkyl with 1–4 carbon atoms.

11. A compound according to claim 1 of the formula

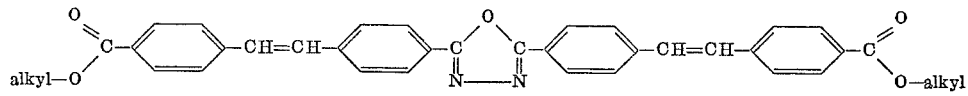

where "alkyl" stands for an alkyl group containing 1 to 2 carbon atoms.

12. A compound according to claim 1 of the formula

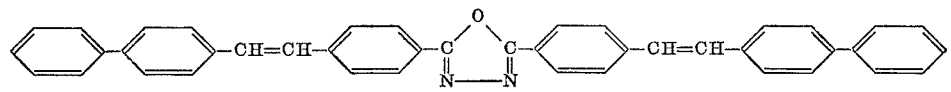

13. A compound according to claim 1 of the formula

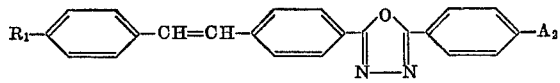

References Cited

UNITED STATES PATENTS 3,328,310   6/1967   Maeder et al. _____ 260—307

HARRY I. MOATZ, Assistant Examiner

U.S. Cl. X.R.

260—2 R, 6, 13, 15, 46.5 R, 47 R, 63 R, 67 R, 75 R, 77.5 R, 78R, 79.7, 80 R, 80.3 R, 82.1, 85.5 ZA, 85.7, 86.1 R, 87.5 R, 87.7, 88.1 R, 88.3 R, 88.7 R, 89.1, 89.7 R, 89.5, 91.1 R, 91.3, 92.8 R, 93.5 R, 93.7, 94.8, 94.9 R, 309, 558H; 252—301.3 W; 117—33.5 R, T

UNITED STATES PATENT OFFICE
CERTIFICATE OF CORRECTION

Patent No. 3,642,783   Dated February 15, 1972

Inventor(s) ADOLF EMIL SIEGRIST ET AL

It is certified that error appears in the above-identified patent and that said Letters Patent are hereby corrected as shown below:

Column 39, lines 15-20, the first line of formulae should read as follows:

Signed and sealed this 18th day of July 1972.

(SEAL)
Attest:

EDWARD M. FLETCHER, JR.
Attesting Officer

ROBERT GOTTSCHALK
Commissioner of Patents